United States Patent
Sumi et al.

(10) Patent No.: US 7,865,890 B2
(45) Date of Patent: Jan. 4, 2011

(54) ELECTRONIC APPARATUS, A NETWORK APPARATUS, A MANAGEMENT METHOD, A SOFTWARE UPDATING METHOD, A MANAGEMENT PROGRAM, A SOFTWARE UPDATING PROGRAM, AND A RECORDING MEDIUM

(75) Inventors: Yasuyuki Sumi, Kanagawa (JP);
Akihiro Yamashita, Kanagawa (JP);
Tsutomu Yuki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1053 days.

(21) Appl. No.: 10/940,634

(22) Filed: Sep. 15, 2004

(65) Prior Publication Data

US 2005/0086654 A1    Apr. 21, 2005

(30) Foreign Application Priority Data

Sep. 16, 2003  (JP) .............................. 2003-323536
Sep. 16, 2003  (JP) .............................. 2003-323537
Aug. 18, 2004  (JP) .............................. 2004-238586

(51) Int. Cl.
*G06F 9/445* (2006.01)

(52) U.S. Cl. ........................ 717/169; 717/170; 717/171; 717/175; 717/176

(58) Field of Classification Search ........................ None
See application file for complete search history.

(56) References Cited

U.S. PATENT DOCUMENTS

| 5,442,791 | A  | * | 8/1995  | Wrabetz et al. ............. 719/330 |
| 6,167,567 | A  | * | 12/2000 | Chiles et al. ................ 717/173 |
| 2001/0047514 | A1 | * | 11/2001 | Goto et al. .................... 717/11 |
| 2002/0100036 | A1 |   | 7/2002  | Moshir et al. |
| 2002/0165984 | A1 |   | 11/2002 | Yuki |
| 2003/0131083 | A1 |   | 7/2003  | Inui et al. |
| 2004/0044999 | A1 | * | 3/2004  | Gibson ........................ 717/178 |

FOREIGN PATENT DOCUMENTS

| JP | 6-309261    | 11/1994 |
| JP | 2001-67225  | 3/2001  |
| JP | 2001-333461 | 11/2001 |

* cited by examiner

*Primary Examiner*—Chuck O Kendall
(74) *Attorney, Agent, or Firm*—Oblon, Spivak, McClelland, Maier & Neustadt, L.L.P.

(57) ABSTRACT

A disclosed electronic apparatus causes a network apparatus to update software of the network apparatus, both apparatuses being connected via a network, and a result of updating is provided to the electronic apparatus. The electronic apparatus includes a software management unit that manages software information for executing the software update, and an apparatus management unit for inquiring about the update result after the elapse of a predetermined period.

28 Claims, 29 Drawing Sheets

```
<softcategory>
    <name>F/W</name>      222
    <url>/fw</url>        223
</softcategory>

<softcategory>
    <name>OS</name>
    <url>/os</url>
</softcategory>

<softcategory>
    <name>Aplication</name>
    <url>/apl</url>
</softcategory>

<softcategory>
    <name>・・・r</name>
    <url>/・・・r</url>
</softcategory>
         :
         :
```

221 { (braces around first softcategory block)

FIG.9

```
                                                                    ╱230
   ┌ <object type="Firmware">                                  ╱232
   │   <field name="rruListURL">http://xxxx/device/autodl/xml/software</field>
   │   <field name="downloadPackURL">http://xxxx/device/autodl/xml/xxx</field>╱ 233
   │   <field name="version">1.12</field> ──────────── 234
   │   <field name="extractedLocation">firmwares/AAA/1.12.exe</field>
231│   <field name="downloadPackSize">7991296</field>
   │   <field name="mid">258</field>                    235
   │   <field name="PnPName">AAA</field>
   │   <field name="fileType" />                 236
   │   <field name="downloadPackName" />
   └ </object>

┌ <object type="Firmware">
   │   <field name="rruListURL">http://xxxx/device/autodl/xml/xxxx</field>
   │   <field name="downloadPackURL">http://xxxx/device/autodl/xml/xxx</field>
   │   <field name="version">2.0</field>
   │   <field name="extractedLocation">firmwares/BBB/2.0.exe</field>
237│   <field name="downloadPackSize">330000</field>
   │   <field name="mid">259</field>
   │   <field name="PnPName">BBB</field>
   │   <field name="fileType" />
   │   <field name="downloadPackName" />
   └ </object>

┌ <object type="Firmware">
   │       :
238│   <field name="PnPName">CCC</field>
   │       :
   └ </object>

┌ <object type="Firmware">
   │       :
239│   <field name="PnPName">DDD</field>
   │       :
   └ </object>
```

FIG.10

```
<object name="" type="rru">
  <field name="rruName">Printer&Network</field>
  <field name="necessaryCondition">??</field>
  <field name="mid">1286</field>
  <field name="moduleURL">printer&network</field>
  <field name="rrupriority">1</field>
  <field name="rruSize">6463284</field>
  <field name="fileName">xxx.rru</field>
</object>

<object name="" type="rru">
  <field name="rruName">Engine</field>
  <field name="necessaryCondition">??</field>
  <field name="mid">1287</field>
  <field name="moduleURL">/engine</field>
  <field name="rrupriority">2</field>
  <field name="rruSize">16912</field>
  <field name="fileName">yyy.rru</field>
</object>
    :
    :
```

FIG.11

```
<object name="" type="module">
  <field name="updateTime">100000</field>
  <field name="timeOut">1000200</field>
  <field name="partNumber">G0805910D</field>
  <field name="moduleName">aaa</field>          ──252
  <field name="mid">2207</field>
  <field name="moduleVersion">1.12</field>      ──253
  <field name="moduleId">JP2Pe_system</field>
</object>

<object name="" type="module">
  <field name="updateTime">200000</field>
  <field name="timeOut">200200</field>
  <field name="partNumber">G0805911</field>
  <field name="moduleName">bbb</field>
  <field name="mid">2208</field>
  <field name="moduleVersion">1.09</field>      ──256
  <field name="moduleId">JP2Pe_pslps</field>
</object>

⋮
```

251 { (first object block)
254 { (second object block)
250 (outer box)

FIG.12

| IP ADDRESS | MAC ADDRESS | MODEL NAME |
|---|---|---|
| xxx. xxx. xxx. xxx | 00.00.00.00.00.01 | AAA |
| yyy. yyy. yyy. yyy | 00.00.00.00.00.02 | BBB |
| zzz. zzz. zzz. zzz | 00.00.00.00.00.03 | AAA |
| vvv. vvv. vvv. vvv | 00.00.00.00.00.04 | AAA |
| | | |

FIG.21

```
<object type="Firmware">
    <field name="rruListURL">http://xxxx/device/autodl/xml/software</field>
    <field name="downloadPackURL">http://xxxx/device//autodl/xml/xxx</field>
    <field name="version">1.12</field>
    <field name="extractedLocation">firmwares/AAA/1.12.exe</field>
    <field name="downloadPackSize">7991296</field>
    <field name="mid">258</field>
    <field name="PnPName">AAA</field>
    <field name="fileType" />
    <field name="downloadPackName" />
    <object name="" type="rru">
        <field name="rruName">Printer&Network</field>
        <field name="necessaryCondition">??</field>
        <field name="mid">1286</field>
        <field name="moduleURL">/printer&network</field>
        <field name="rrupriority">1</field>
        <field name="rruSize">6463284</field>
        <field name="fileName">xxx.rru</field>
        <object name="" type="module">
            <field name="updateTime">100000</field>
            <field name="timeOut">1000200</field>
            <field name="partNumber">G0805910D</field>
            <field name="moduleName">aaa</field>
            <field name="mid">2207</field>
            <field name="moduleVersion">1.12</field>
            <field name="moduleId">JP2Pe_system</field>
        </object>
        <object name="" type="module">
            <field name="updateTime">200000</field>
            <field name="timeOut">200200</field>
            <field name="partNumber">G0805911</field>
            <field name="moduleName">bbb</field>
            <field name="mid">2208</field>
            <field name="moduleVersion">1.09</field>
            <field name="moduleId">JP2Pe_pslps</field>
        </object>
    </object>
</object>
```

1454:
```
<object name="" type="rru">
  <field name="rruName">Engine</field>
  <field name="necessaryCondition">??</field>
  <field name="mid">1287</field>
  <field name="moduleURL">/engine</field>
  <field name="rrupriority">2</field>
  <field name="rruSize">16912</field>
  <field name="fileName">yyy.rru</field>
  <object name="" type="module">
    <field name="updateTime">100000</field>
    <field name="timeOut">100200</field>
    <field name="partNumber">G0805621B</field>
    <field name="moduleName">ccc</field>
    <field name="mid">2209</field>
    <field name="moduleVersion">V1.01:00</field>
    <field name="moduleId">JP2Pa_dspmodule</field>
  </object>
</object>
```

1455:
```
<object name="" type="rru">
  <field name="rruName" />
  <field name="necessaryCondition">??</field>
  <field name="mid">1288</field>
  <field name="moduleURL" />
  <field name="rrupriority">3</field>
  <field name="rruSize">1049028</field>
  <field name="fileName">jp1.rru</field>
  <object name="" type="module">
    <field name="updateTime">100000</field>
    <field name="timeOut">100200</field>
    <field name="partNumber">G0805601H</field>
    <field name="moduleName">ddd</field>
    <field name="mid">2210</field>
    <field name="moduleVersion">1.07:06</field>
    <field name="moduleId">JP2Pa_cplot</field>
  </object>
</object>
```

FIG.23

```
<object name="" type="rru">
  <field name="rruName" />
  <field name="necessaryCondition">??</field>
  <field name="mid">1289</field>
  <field name="moduleURL" />
  <field name="rrupriority">4</field>
  <field name="rruSize">262716</field>
  <field name="fileName">music.rru</field>
  <object name="" type="module">
    <field name="updateTime">100000</field>
    <field name="timeOut">100200</field>
    <field name="partNumber">G0805611B</field>
    <field name="moduleName">eee</field>
    <field name="mid">2211</field>
    <field name="moduleVersion">M1.01:08</field>
    <field name="moduleId">JP2Pa_music</field>
  </object>
</object>
<object name="" type="rru">
  <field name="rruName" />
  <field name="necessaryCondition">??</field>
  <field name="mid">1290</field>
  <field name="moduleURL" />
  <field name="rrupriority">5</field>
  <field name="rruSize">1445244</field>
  <field name="fileName">phyload.rru</field>
  <object name="" type="module">
    <field name="updateTime">300000</field>
    <field name="timeOut">300200</field>
    <field name="partNumber">G0805920C</field>
    <field name="moduleName">fff</field>
    <field name="mid">2212</field>
    <field name="moduleVersion">3.0.1</field>
    <field name="moduleId">JP2Pa_net</field>
  </object>
</object>
</object>
    :
    :
```

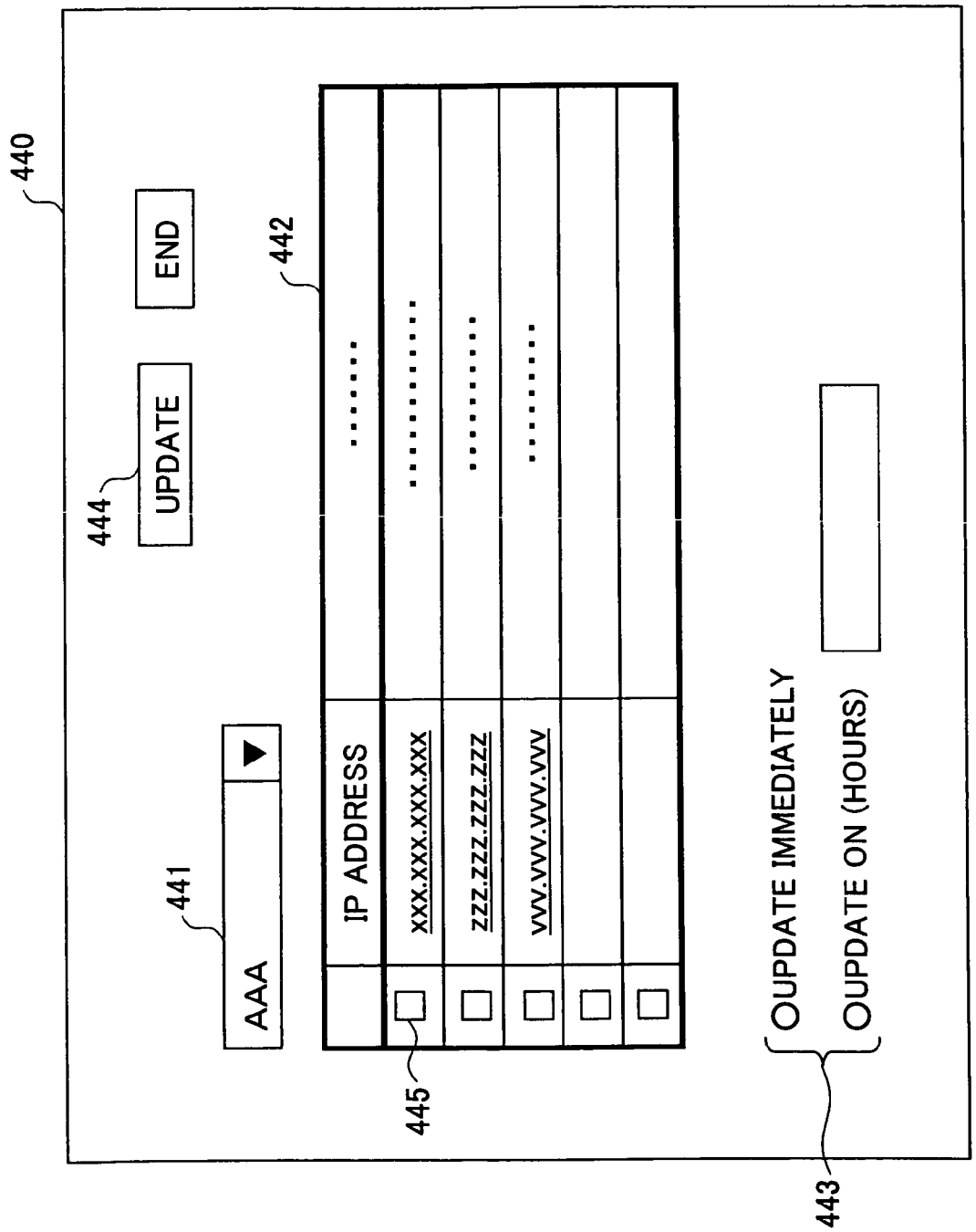

FIG.26

| FIRMWARE NAME | FIRMWARE ID | VERSION |
|---|---|---|
| aaa | 2207 | V1.1 |
| bbb | 2208 | V1.5 |
| ccc | 2209 | V1.2 |
| .. | .. | .. |

FIG.27

| ERROR CODE | ID OF FIRMWARE TO WHICH ERROR OCCURRED |
|---|---|
| E000001 | 2207 |
| E000002 | 2208 |
| .. | .. |

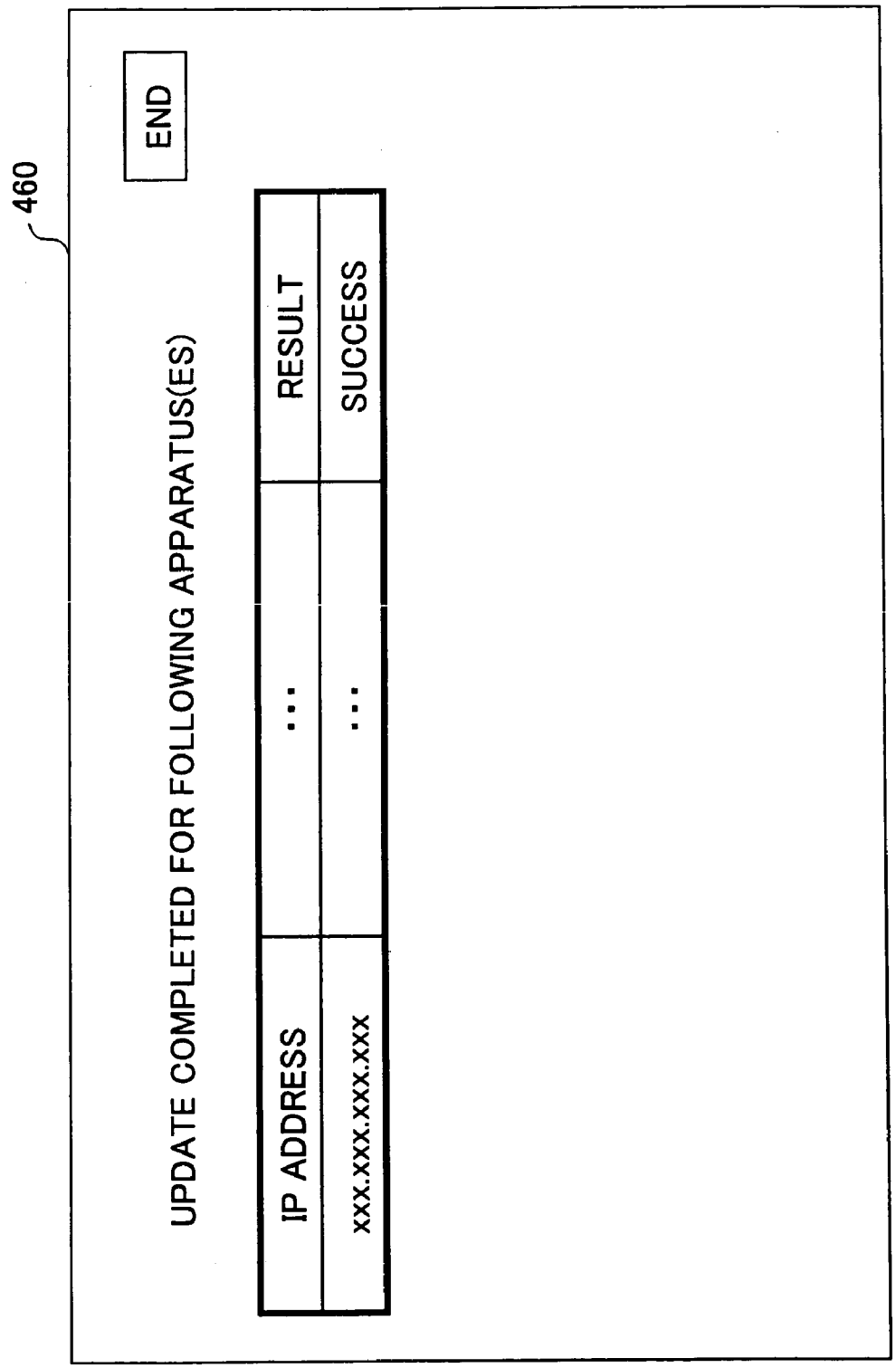

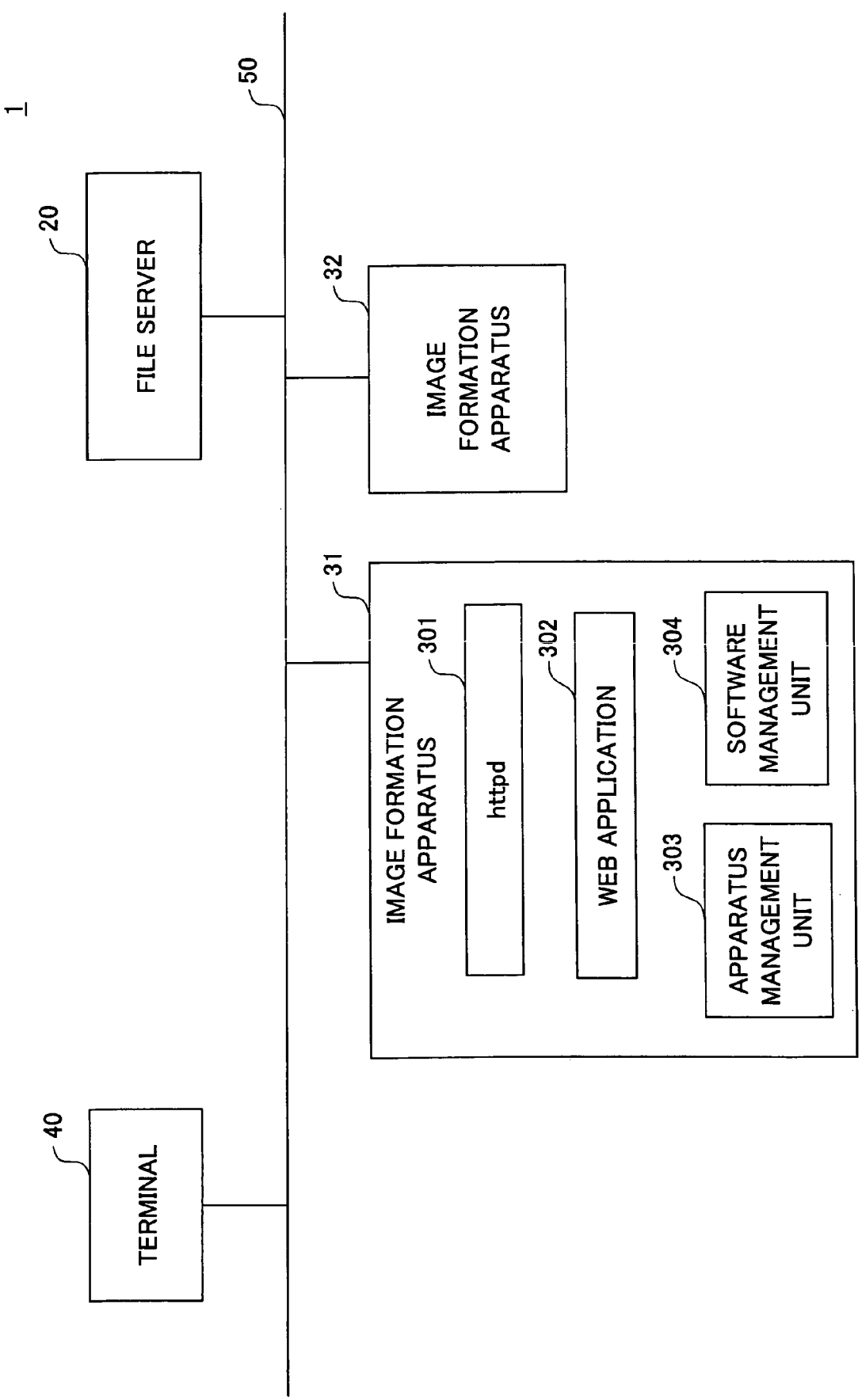

ELECTRONIC APPARATUS, A NETWORK APPARATUS, A MANAGEMENT METHOD, A SOFTWARE UPDATING METHOD, A MANAGEMENT PROGRAM, A SOFTWARE UPDATING PROGRAM, AND A RECORDING MEDIUM

BACKGROUND OF THE INVENTION

1. Field of the Invention

The present invention generally relates to an electronic apparatus, a network apparatus, a management method, a software updating method, a management program, and a recording medium; and especially relates to an electronic apparatus, a management method, a management program, and a recording medium that are configured to update software of the network apparatus connected to the electronic apparatus via a network.

2. Description of the Related Art

Further, the present invention relates to a network apparatus, software of which is updated by the electronic apparatus, a software updating method, a software updating program, and a recording medium.

BACKGROUND OF THE INVENTION

A technology that enables updating of firmware of various network apparatuses such as a printer and a facsimile apparatus (FAX) connected to a network from a terminal by a remote operation is already available.

A conventional updating method is described with reference to FIG. 1, which is a block diagram of a system 500. There, firmware of a network apparatus is updated by a remote operation. As shown in FIG. 1, the system 500 consists of a terminal 501, an apparatus management server 502, a file server 503, and a network apparatus 504, each of which is connected to a network such as a LAN.

The terminal 501 is a terminal that a user directly operates. The apparatus management server 502 is a computer that uploads firmware, etc., to the network apparatus 504 according to a command issued by the terminal 501. The file server 503 is a computer that manages various sets of firmware for the network apparatus 504 as files. The network apparatus 504 is the target apparatus, the firmware of which is to be updated.

First, the apparatus management server 502 downloads the firmware from the file server 503 (S11).

When the command to upload the firmware is issued by the terminal 501 (S12) to the network apparatus 504, the apparatus management server 502 uploads the firmware to the network apparatus 504 (S13), and provides a result report to the terminal 501 (S14). Then, the network apparatus 504 performs an update process at a predetermined timing such that the firmware is updated by the uploaded firmware, and a reset process is carried out to complete installation of the updated firmware (S15).

In this manner, the firmware of the network apparatus 504 is updated by the apparatus management server 502 based on the command from the terminal 501.

DESCRIPTION OF THE INVENTION

Problem(s) to be Solved by the Invention

However, as mentioned above, according to the conventional method, the firmware software updating process (S15) of the network apparatus 504 is performed asynchronous to the command from the terminal 501 (S12). This is because resetting of the network apparatus 504 is necessary, and the session between the apparatus management server 502 and the network apparatus 504 has to be discontinued in order to complete the installation of the updated firmware.

For this reason, although the terminal 501 can determine a success or failure in "uploading" of the software to the network apparatus 504 from the apparatus management server 502, a problem is that success or failure in "updating" at the network apparatus 504 cannot be determined in a timely manner.

SUMMARY OF THE INVENTION

Accordingly, it is a general object of the present invention to provide an electronic apparatus, a network apparatus, a management method, a management program, and a recording medium that substantially obviate one or more of the problems caused by the limitations and disadvantages of the related art.

Specifically, the present invention provides an electronic apparatus, a management method, a management program, and a recording medium that enable a user to timely determine the success or failure of a software updating process performed by a network apparatus, when the software of the network apparatus is to be updated via a network. In addition, the present invention provides a network apparatus, a software updating method, a software updating program, and a recording medium that are configured to provide the electronic apparatus with a report as to the success or failure of the software updating process.

Features and advantages of the present invention are set forth in the description that follows, and in part will become apparent from the description and the accompanying drawings, or may be learned by practice of the invention according to the teachings provided in the description. Objects as well as other features and advantages of the present invention will be realized and attained by an electronic apparatus, a network apparatus, a management method, a management program, and a recording medium particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides as follows.

Means for Solving the Problem

An aspect of the present invention provides an electronic apparatus that performs a software updating process of a network apparatus, both apparatuses being connected via a network. The electronic apparatus includes a software management unit that manages the software, which is current, and software information for updating the software, and an apparatus management unit that requests the network apparatus to provide a result report about the software updating process performed by the network apparatus. The electronic apparatus is characterized by providing the request for the result report of the software updating process after a lapse of a predetermined period that is specified by the software information.

The electronic apparatus is made capable of requesting the result report about the software updating process when the software updating process is completed by the network apparatus.

Another aspect of the present invention provides a network apparatus, which is connected to an electronic apparatus through a network. The network apparatus includes a software update control unit that performs a software updating process based on the software provided by the electronic apparatus, and an error information storing unit that stores a result of the software updating process performed by the software update control unit. The network apparatus is characterized by providing the result of the software updating process to the electronic apparatus when a command from the electronic apparatus is issued, the result being stored in the error information storing unit.

The network apparatus is made capable of providing the result of the software updating process to the electronic apparatus.

Further, in order to solve the problem, the present invention provides a management method of the electronic apparatus, a management program for the electronic apparatus to execute the management method, and a recording medium that stores the management program.

Further, in order to solve the problem, the present invention provides a software updating method of the network apparatus, a software updating program for the network apparatus to execute the software updating method, and a recording medium that stores the software updating program.

EFFECT OF THE INVENTION

As described above, the present invention provides the electronic apparatus, the management method, the management program, and the recording medium that enable a user to easily and timely determine the result of the software updating process carried out by the network apparatus when the software of the network apparatus is updated through the network. Further, the present invention provides the network apparatus, the software updating method, the software updating program, and the recording medium that can provide the result of the software updating process to the electronic apparatus.

BRIEF DESCRIPTION OF THE DRAWINGS

FIG. 8 shows a display example of a URL list provided by the file server;

FIG. 9 shows an example of a package list provided by the file server;

FIG. 10 shows a display example of an "rru" file list provided by the file server;

FIG. 11 shows a display example of a firmware list provided by the file server;

FIG. 12 is a table showing an example of an apparatus configuration list managed by an apparatus information storing unit;

FIG. 21 shows a display example of package meta-information managed by a package meta-information storing unit;

FIG. 22 shows a display example of the package meta-information managed by the package meta-information storing unit;

FIG. 23 shows a display example of the package meta-information managed by the package meta-information storing unit;

FIG. 24 shows a display example of an update direction;

FIG. 26 shows a table of version information about firmware managed by a version information storing unit;

FIG. 27 shows a table of error information stored in an error information storing unit;

FIG. 29 shows a display example of a result of the determining process; and

FIG. 30 is a block diagram of a structure example of the apparatus management system wherein the image formation apparatus serves as the apparatus management server.

DESCRIPTION OF THE PREFERRED EMBODIMENTS

In the following, embodiments of the present invention are described with reference to the accompanying drawings.

Figure 1:
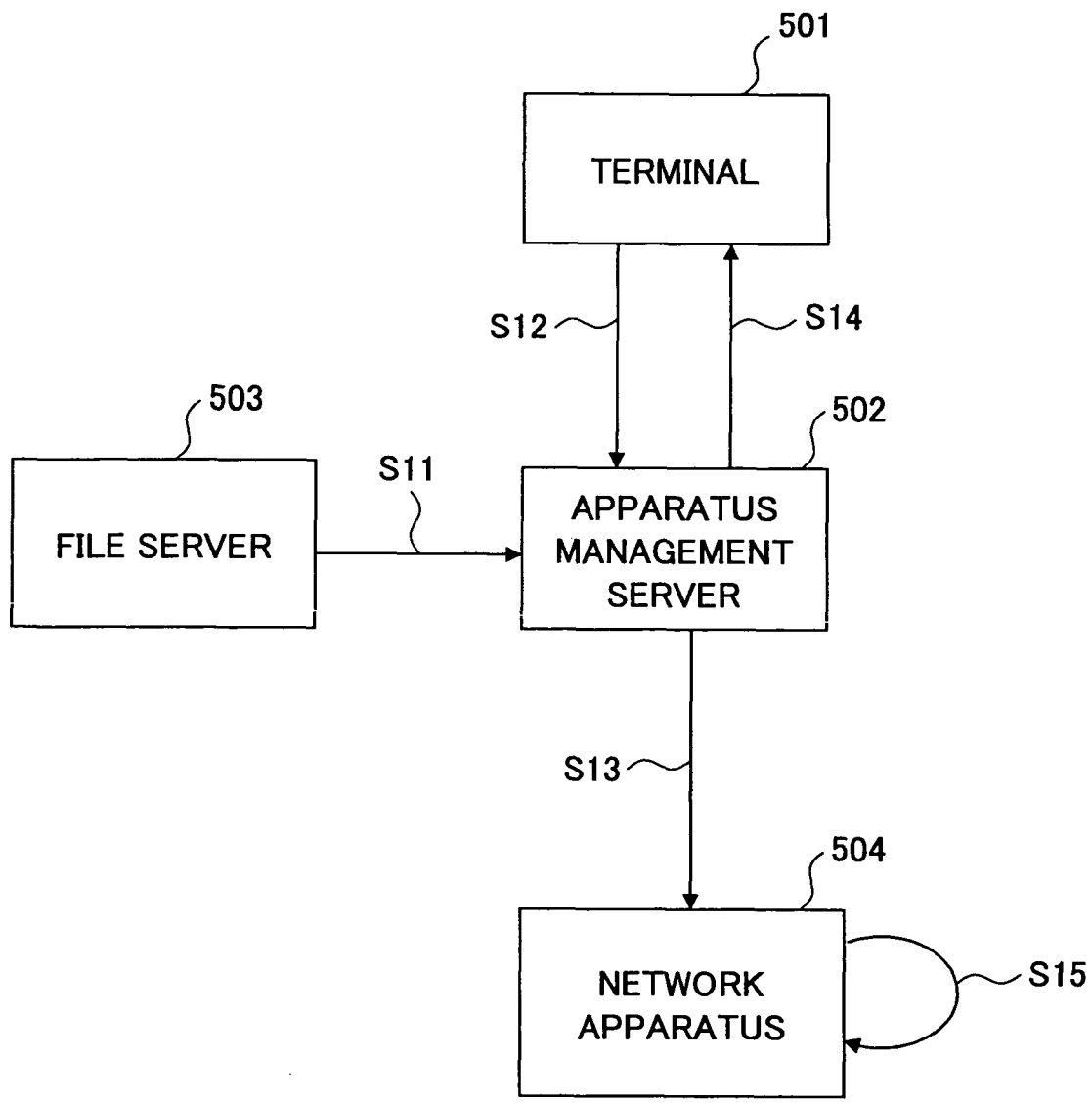
FIG. 1 is a block diagram of a network apparatus, wherein a firmware updating process is carried out by a remote operation according to a conventional method.
Figure 2:
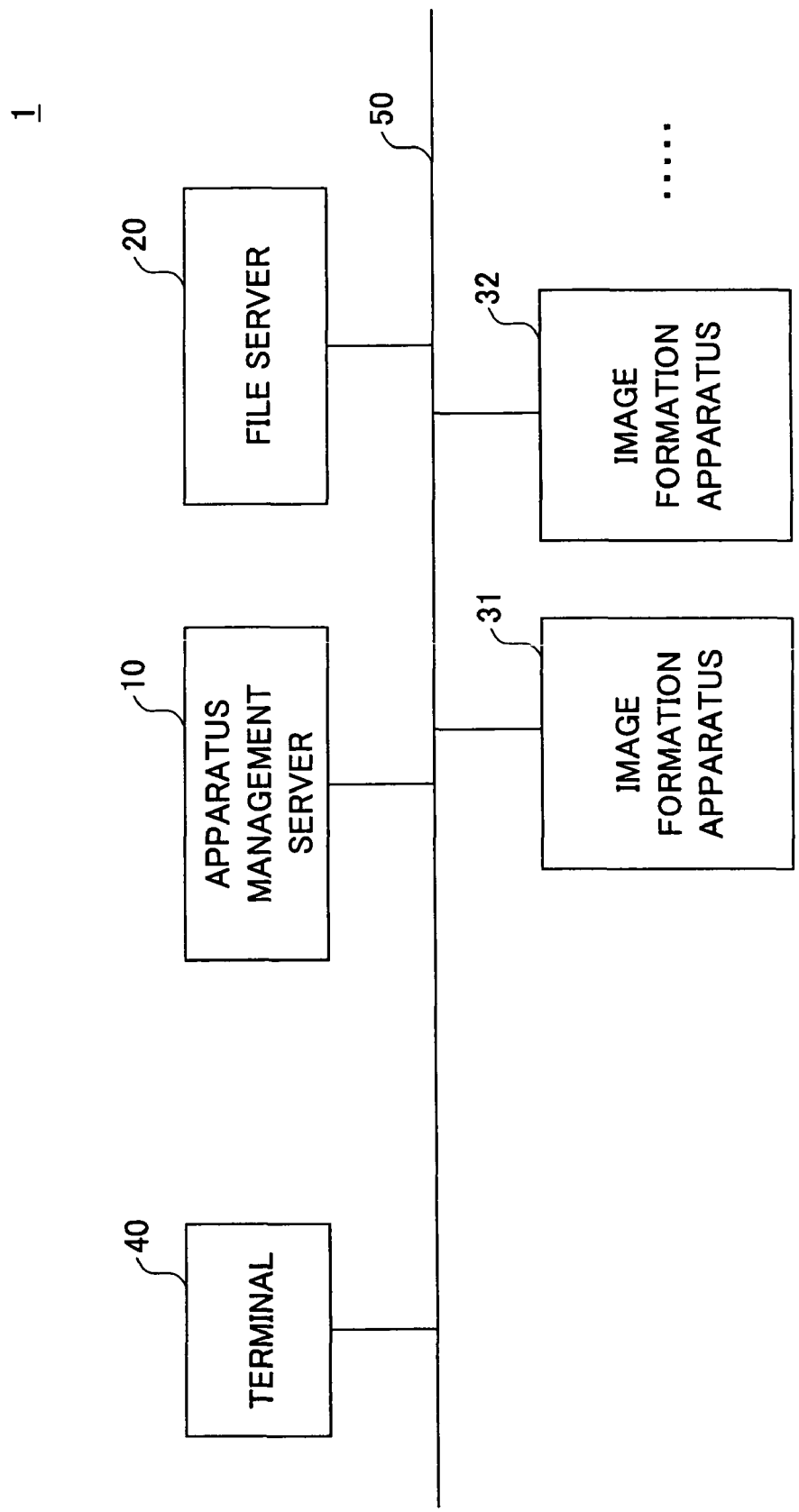
FIG. 2 is a block diagram showing a structure example of an apparatus management system according to an embodiment of the present invention.

FIG. 2 is a block diagram showing a structure example of an apparatus management system 1 according to an embodiment of the present invention. As shown in FIG. 2, the apparatus management system 1 includes an apparatus management server 10, a file server 20, one or more image formation apparatuses (such as image formation apparatuses 31 and 32), and a terminal 40, all of which are connected to a communications network 50 such as a LAN that is either wired or wireless.

The apparatus management server 10 is a computer that carries out, among other things, uploading of software to the image formation apparatus 31, and the like according to a command from the terminal 40. Further, the apparatus management server 10 serves as a Web server. Therefore, the user of the terminal 40 can use a service of the apparatus management server 10 through a Web page that the apparatus management server 10 provides.

The file server 20 is a computer that manages, among other things, various sets of software that the apparatus management server 10 uploads to the image formation apparatus 31, and the like. That is, the apparatus management server 10 downloads certain software from the file server 20 before uploading the software to the image formation apparatus 31, and the like. Here, the downloading of the software by the apparatus management server 10 is performed according to directions from the terminal 40.

Figure 3:
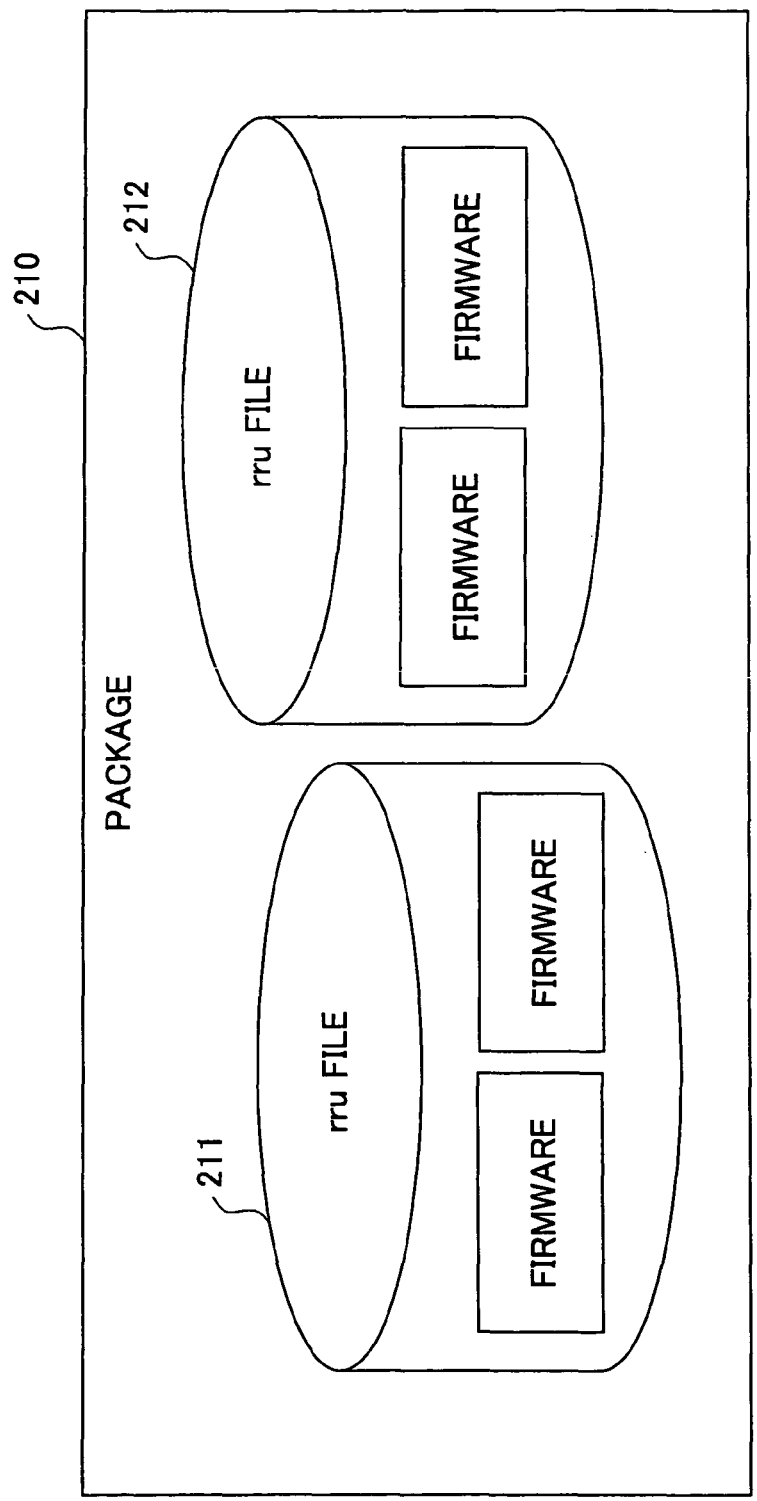
FIG. 3 is a block diagram for explaining the configuration of software managed by a file server.

FIG. 3 is a block diagram for explaining the configuration of software managed by the file server 20. According to the present embodiment, the various sets of software applied to the image formation apparatus 31, and the like are packaged to facilitate software management.

In FIG. 3, a package 210 corresponds to compressed files. The package 210 is an aggregate of software, where software applicable to the image formation apparatus 31 is stored. A process such as a download process to the apparatus management server 10 from the file server 20 is performed considering the package 210 as a unit, i.e., on a package-by-package basis.

The package 210 includes one or more rru files (an rru file 211 and an rru file 212 in FIG. 3). The rru file is a file that contains one or more sets of bug-patched/enhanced software. Uploading to and updating of software of the image formation apparatus 31, and the like are performed considering the rru file as a unit. FIG. 3 shows an example wherein one or more sets of firmware are stored as the software. Here, "uploading" refers to transferring the software from the apparatus management server 10 to the image formation apparatus 31, for example; and "updating" refers to updating of software installed in the image formation apparatus 31 by the software transferred from the apparatus management server 10 to the image formation apparatus 31, for example.

According to the present embodiment, the package 210 is generated for each combination of a model name for differentiating models of the image formation apparatus 31 and a version of the package 210. That is, a package having a version unique to a model name of the image formation apparatus 31 constitutes the package 210. The package 210 contains only software in the same category, and the software is effective only for the same model.

With reference to FIG. 2, the image formation apparatuses 31 and 32 are examples of network apparatuses. The network apparatuses include common printers, and compound (multi-function) machines serving as a printer, a copier, and/or a facsimile apparatus.

The terminal 40 is a PC (Personal Computer), a PDA (Personal Digital (Data) Assistant), a cellular phone, or the like that is equipped with a Web browser for displaying a Web page provided by the apparatus management server 10, and that is operated by the user of the apparatus management system 1.

Figure 4:
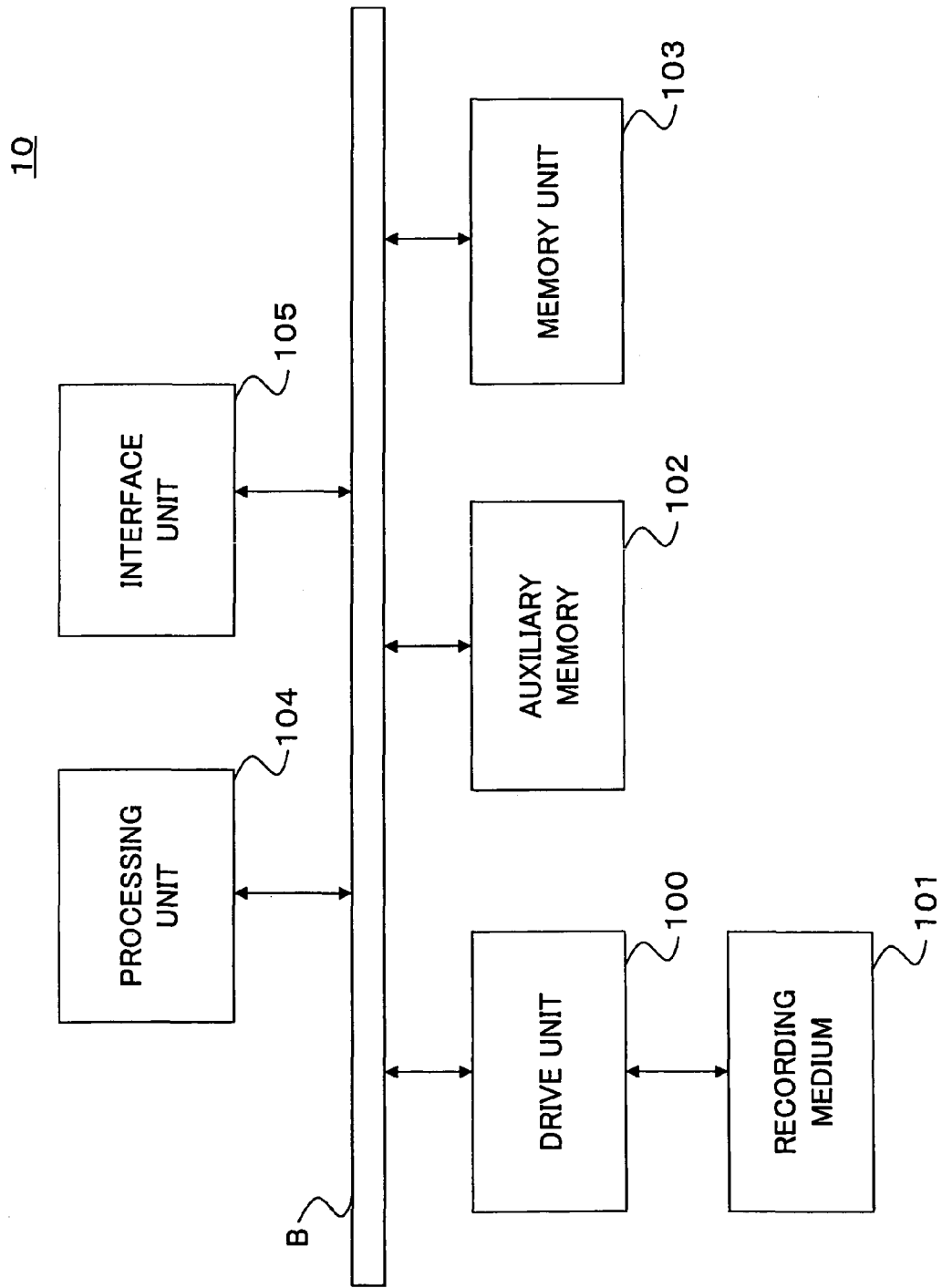
FIG. 4 is a block diagram showing an example of hardware configuration of an apparatus management server according to the embodiment of the present invention.

Next, details of the apparatus management server 10 are explained. FIG. 4 is a block diagram showing an example of hardware configuration of the apparatus management server 10 according to the present embodiment. The apparatus management server 10 of FIG. 4 includes a drive apparatus 100, a secondary storage 102, a memory unit 103, a processing unit 104, and an interface unit 105, all of which are mutually connected by a bus B for communicating.

An apparatus management program that is executed by the apparatus management server 10 is provided by a recording medium 101, such as a CD-ROM. When the recording medium 101 containing the apparatus management program is set to the drive apparatus 100, the apparatus management program is installed in the secondary storage 102 from the recording medium 101 through the drive apparatus 100. The secondary storage 102 stores a required file, required data, etc., while storing the apparatus management program that is installed.

The memory unit 103 reads and holds the apparatus management program copied from the secondary storage 102, when a direction to start the apparatus management program is issued. The processing unit 104 performs a function related to the apparatus management server 10, according to the apparatus management program held in the memory unit 103. The interface unit 105 includes a modem, a router, etc., which make communication connections to the network 50 shown in FIG. 2.

Figure 5:
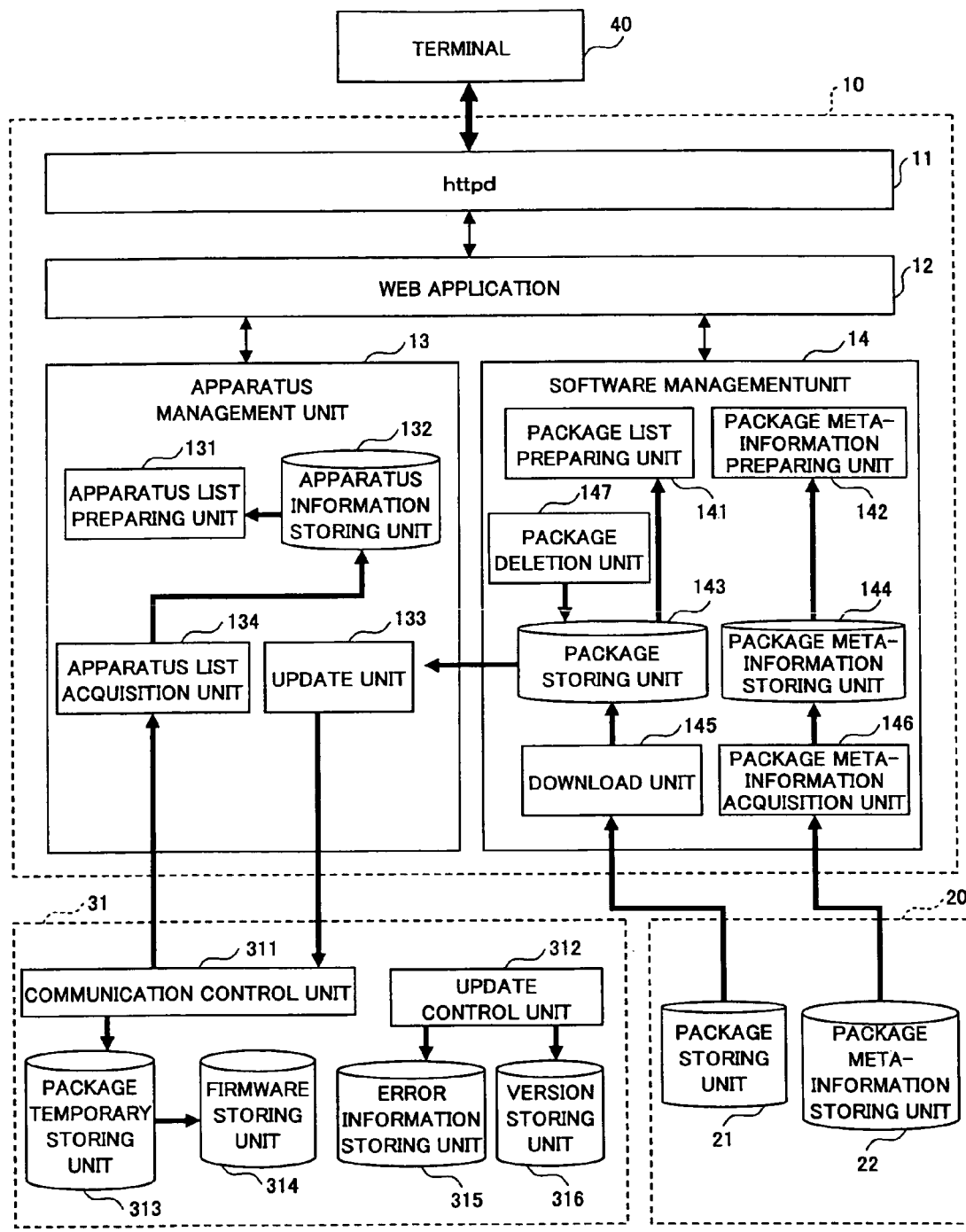
FIG. 5 is a block diagram showing an example of the functional structure of the apparatus management system according to the embodiment of the present invention.

FIG. 5 is a block diagram showing an example of the functional structure of an apparatus management system according to the present embodiment. As shown in FIG. 5, the apparatus management server 10 includes an httpd 11, a Web application 12, an apparatus management unit 13, and a software management unit 14.

The httpd 11 is a daemon program for receiving an HTTP request provided from the terminal 40, and for requesting generation of information (a Web page) requested by the HTTP request. The Web application 12 generates the requested Web page. Then, the httpd 11 provides the terminal 40 with an HTTP response that includes the generated Web page. The Web application 12 is a so-called Web application for processing a request from the terminal 40, and for generating a Web page that displays a result of the process.

The apparatus management unit 13 is equipped with a management function to manage the image formation apparatuses 31, 32, and the like that are managed by the apparatus management server 10, and includes an apparatus list preparing unit 131, an apparatus information storing unit 132, an updating unit 133, and an apparatus list acquisition unit 134.

The apparatus information storing unit 132 is for storing a file and the like that contain attribute information, such as a model name for specifying the model of the image formation apparatus 31, that is managed by the apparatus management server 10, and an IP address. The apparatus list preparing unit 131 is a module for communicating information managed by the apparatus information storing unit 132 to the Web application 12. The updating unit 133 is a module for uploading a package stored in the package storing unit 143 (described later) to the image formation apparatus 31, and for determining whether the package is to be normally update-installed to the image formation apparatus 31. The apparatus list acquisition unit 134 is a module for detecting the image formation apparatus 31 connected to the network 50, acquiring attribute information, such as a model name and an IP address of the detected image formation apparatus 31 from the image formation apparatus 31, and storing the acquired attribute information in the apparatus information storing unit 132.

The software management unit 14 provides a function of managing a package to be uploaded to the image formation apparatus 31, and the like, and includes a package list preparing unit 141, a package meta-information preparing unit 142, a package storing unit 143, a package meta-information storing unit 144, a download unit 145, a package meta-information acquisition unit 146, and a package deleting unit 147.

The package storing unit 143 stores a folder, and the like where a package downloaded from the file server 20 by the download unit 145 is stored. The package list preparing unit 141 is a module for providing the package list information stored in the package storing unit 143 to the Web application 12. The package meta-information storing unit 144 stores a file, and the like managing the package meta-information stored in the package storing unit 143. Here, the package meta-information refers to concerned package attribute information. The package meta-information preparing unit 142 is a module for providing the package meta-information stored in the package meta-information storing unit 144 to the Web application 12. The download unit 145 is a module for downloading a package from the file server 20, and for storing the package in the package storing unit 143. The package meta-information acquisition unit 146 is a module for acquiring the meta-package information from the file server 20, the meta-package information being managed by the file server 20, and for storing it in the package meta-information storing unit 144. The package deleting unit 147 is a module for deleting a package stored in the package storing unit 143.

The file server 20 includes a package storing unit 21 and a package meta-information storing unit 22. The package storing unit 21 is for storing a package applicable to the image formation apparatus 31, and the like. The package meta-information storing unit 22 is for storing a file, and the like, in which the meta-information of the package stored in the package storing unit 21 is stored.

The image formation apparatus 31 includes a communications control unit 311, an update control unit 312, a package temporary storing unit 313, a firmware storing unit 314, an error information storing unit 315, and a version information storing unit 316.

The communications control unit 311 is a module for controlling communications with the apparatus management server 10. According to the present embodiment, since the communications between the apparatus management server 10 and the image formation apparatus 31 are performed by FTP, the communications control unit 311 functions as an FTP server. The package temporary storing unit 313 stores a folder, and the like where the package uploaded from the apparatus management server 10 is temporarily stored. The update control unit 312 is a module for updating the firmware contained in the package that is uploaded to the package temporary storing unit 313.

The firmware storing unit 314 stores a folder, and the like that should be arranged in order that firmware may function. The error information storing unit 315 stores error information, when an error occurs in the updating process of the package, the process being performed by the update control unit 312. The version information storing unit 316 stores version information on current firmware installed in the image formation apparatus 31.

Although FIG. 5 shows the functional structure of the image formation apparatus 31, the same structure applies to the image formation apparatus 32, and the like.

In the following, a process carried out by the apparatus management server 10 as shown in FIG. 5 is explained. First, a process for the apparatus management server 10 providing the terminal 40 with a list of one or more packages (package list) that can be downloaded is explained. Here, and hereafter, "download" refers to download from the file server 20 to the apparatus management server 10.

Figure 6:
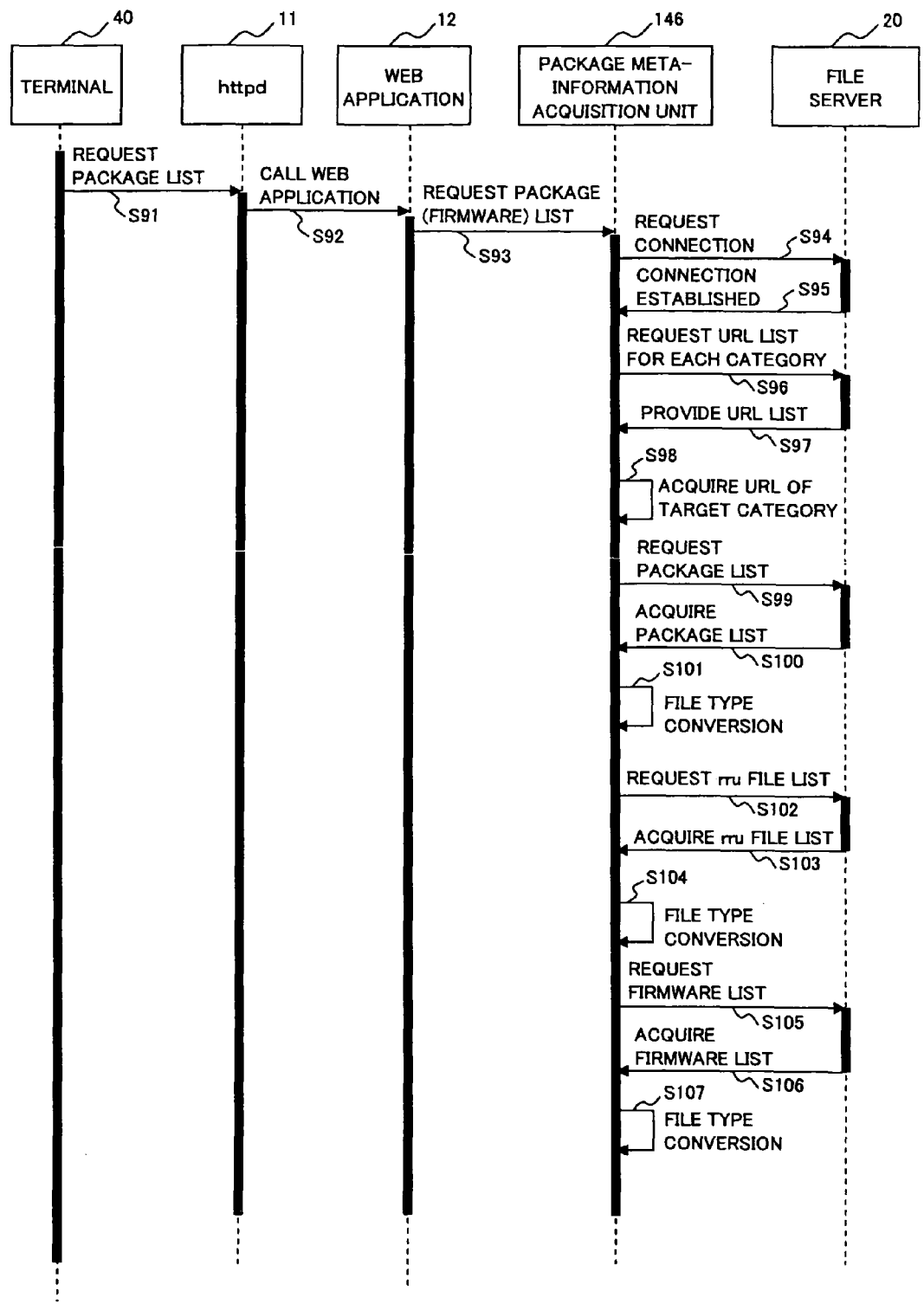
FIG. 6 is a sequence diagram of a listing process for listing packages that can be downloaded.
Figure 7:
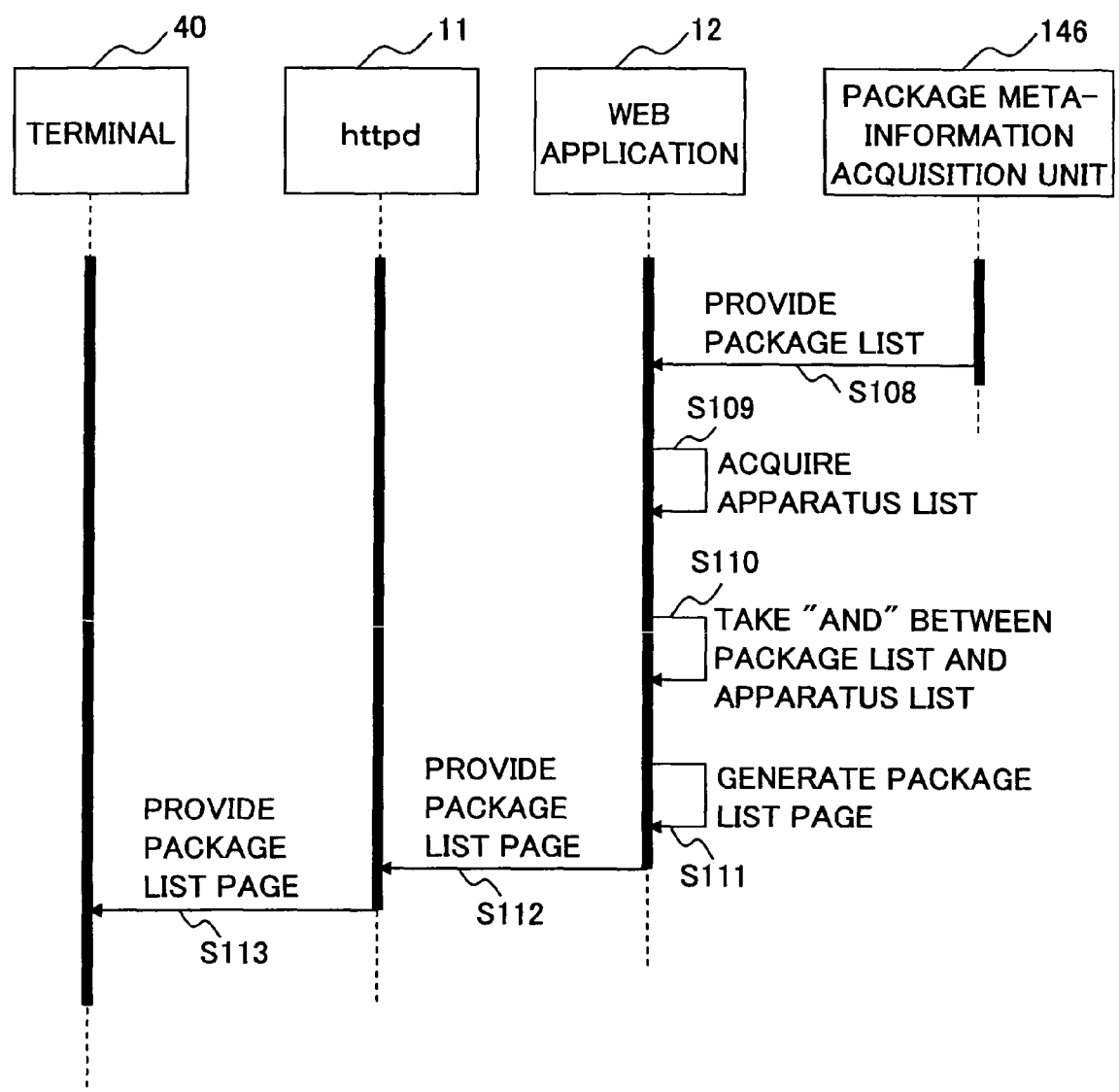
FIG. 7 is a sequence diagram of the listing process for listing packages that can be downloaded.

FIG. 6 and FIG. 7 are sequence diagrams of the process for preparing the package list.

At step S91, the terminal 40, based on an input from the user, requests (an HTTP request) the apparatus management server 10 to provide a Web page that displays the package list, the Web page being called "a package list page". As inputs from the user, an input of a URL to the package list page on a Web browser, an input of directions to change page to page, etc., are possible. Here, the case wherein the package list page is requested is explained.

Then, at Step S92, the httpd 11 that receives the HTTP request from the terminal 40 calls the Web application 12, and requests the Web application 12 to generate the package list page. Then, at Step S93, the Web application 12 requests the package meta-information acquisition unit 146 to provide information about the package list of the firmware.

The package meta-information acquisition unit 146 establishes a communications session with the file server 20 at Steps S94 and S95, and requests the file server 20 to provide a URL list corresponding to each category of the package list at Step S96. That is, in the file server 20, separate URL folders are prepared for each category of software, and package lists showing packages that belong to each category are contained in the respective folders.

Here, according to the present embodiment, communications between the apparatus management server 10 and the file server 20 are performed by HTTP. Therefore, the request from the apparatus management server 10 is transmitted to the file server 20 as an HTTP request, and a response from the file server 20 is transmitted to the apparatus management server 10 as an HTTP response.

Progressing to Step S97, the file server 20 acquires the URL list in XML (extensible Markup Language) from the package meta-information storing unit 22, and transmits the URL list to the apparatus management server 10.

FIG. 8 shows an example of the URL list 220 transmitted from the file server 20. The URL list 220 contains information about packages that belong to each category. Each category is delimited by a pair of <softcategory> tags, and contains name and URL information. For example, the category specified by a description 221 contains name information specified by a description 222, F/W, standing for firmware, delimited by a pair of <name> tags, and URL information specified by a description 223, /fw, delimited by a pair of <url> tags. Here, the URL is expressed by a relative path in reference to a predetermined folder of the file server 20.

Progressing to Step S98, the package meta-information acquisition unit 146 acquires the URL information specified by a description 223 of the firmware package list contained in the URL list 220. Then, at Step S99, the package meta-information acquisition unit 146 requests the file server 20 to provide the package list specified by the URL that is acquired at Step S98. At Step 100, the file server 20 acquires the package list specified by the URL from the package meta-information storing unit 22 in XML, and communicates the package list to the package meta-information acquisition unit 146.

FIG. 9 shows an example of a package list 230 transmitted from the file server 20. In the package list 230, each set of package information is delimited by a pair of <object> tags. For example, the first set specified by a description 231 of the package information indicates that a package name is "AAA" (description 236), a version number is "V1.12" (description 234), a URL of the list information on the rru file included in the package is "http://xxxx/device/autodl/xml/software" (description 232), a file size of the package is "7991296" (K byte) (description 235), and a URL of the package itself is "http://xxxx/device/autodl/xml/xxx" (description 233). Other sets of package information specified by descriptions 237, 238, and 239, the package names being "BBB", "CCC", and "DDD", respectively, are provided in the same manner as above, being delimited by the respective pairs of the <object> tags.

Here, each package name corresponds to a model name of the image formation apparatuses. As mentioned above, a package is unique to each model and each version within a category. That is, packages corresponding to models AAA, BBB, CCC, and DDD are managed by the package list 230 of the file server 20.

At Step S100, the package meta-information acquisition unit 146 converts the package list 230 in the XML form into a data type that the Web application 12 can interpret, for example, a structure. At Step S102, the package meta-information acquisition unit 146 acquires the URL information (description 232) from the package list 230 (FIG. 9) corresponding to a list of rru files, "rru file list", contained in the package AAA, and transmits the rru file list specified by the URL to the file server 20.

At Step S103 following Step S102, the file server 20 acquires the rru file list in the XML form specified by the URL communicated by the package meta-information acquisition unit 146 from the package meta-information storing unit 22, and transmits the rru file to the package meta-information acquisition unit 146.

FIG. 10 shows an example of an rru file list 240 provided by the file server. In the rru file list 240, information about each rru file is described in the area that is delimited by a pair of <object> tags. For example, a description 241 contains information about the rru file. In the case of the example, the information includes the name (description 242) of the rru file, "rru file name", which is "Printer&Network"; the URL (description 243) where the list information of the firmware contained in the rru file is stored, which is "/printer&network"; and the file size (description 244) of the rru file, which is "6463284" (K byte). Information about other rru files (description 245, and so on) is similarly described in respective areas delimited by respective pairs of the <object> tags.

At Step S104, the package meta-information acquisition unit 146 converts the rru file list 240, which is in the XML form, into a data type that the Web application 12 can interpret. Next, at Step S105, the package meta-information acquisition unit 146 acquires the URL (description 243, and the like) of the list of the firmware ("firmware list") contained in each rru file from the rru file list 240, and requests the file server 20 to provide the firmware list specified by the URL.

At Step S106, the file server 20 acquires the firmware list specified by the URL provided by the package meta-information acquisition unit 146 from the package meta-information storing unit 22 in the XML form, and transmits the firmware list to the package meta-information acquisition unit 146.

FIG. 11 shows an example of a firmware list 250 transmitted from the file server 20. In the firmware list 250, information about each firmware item is described in the area that is delimited by a pair of the <object> tags. For example, a description 251 includes the name (description 252) of the firmware "moduleName", which is "aaa"; a version number (description 253) of the firmware "moduleVersion", which is "1.12"; and the like. Firmware, the name of which is "bbb" is similarly described in the area delimited by another pair of the <object> tags (description 254).

At Step S107, the package meta-information acquisition unit 146 converts the firmware list 250 in the XML form into a data type that the Web application 12 can interpret. Then, the process progresses to Step S108 in FIG. 7. At Step S108, the package meta-information acquisition unit 146 communicates the package list, the data type of which is converted, to the Web application 12.

At Step S109, the Web application 12 acquires a list of the image formation apparatuses ("apparatus list") that are managed by the apparatus management server 10.

FIG. 12 shows an example of the apparatus list managed by the apparatus list preparing unit 131. As shown in FIG. 12, the apparatus list includes information, such as an IP address, a MAC (Media Access Control) address, and a model name of the image formation apparatus 31 that are managed by the apparatus management server 10. According to the example of FIG. 12, there are four sets of image formation apparatuses managed by the apparatus management server 10, where the model name of three sets is "AAA", and the model name of the remaining one set is "BBB". Accordingly, the apparatus list as shown in FIG. 12 is provided to the Web application 12.

Then, at Step S110, the Web application 12 extracts the package list information corresponding to the model name of the image formation apparatus 31 from the package list by taking an AND (logical product) of the model name of the package list and the model name of the apparatus list. The package list information extracted here is called "extracted package list".

The process described above is provided for the reason that follows. That is, a possibility is that the file server 20 may also serve one or more apparatus management servers other than the apparatus management server 10, and may store packages for apparatuses that are not managed by the apparatus management server 10. Therefore, the package list communicated from the file server 20 may include information for apparatuses that are not managed by the apparatus management server 10. Further, not all the packages for the apparatuses managed by the apparatus management server 10 may be stored in the file server 20.

In this situation, if the package list acquired from the file server 20 is used as is for generating the package list page, unnecessary and meaningless information is provided to the user. On the other hand, if the package list corresponding to the model contained in the apparatus list acquired from the apparatus information storing unit 132 is used as is for generating the package list page, a package that is not managed by the file server 20 may be shown. That is, a package that cannot be downloaded is displayed as a candidate for downloading.

In order to avoid this situation, and to provide the user with only applicable information, the Web application 12 extracts the information corresponding to the image formation apparatus managed by the apparatus management server 10 from the package list.

According to the present embodiment, the package list contains package information for the models AAA, BBB, CCC, and DDD as shown in FIG. 9, and the apparatus information includes the models AAA and BBB as shown in FIG. 12. Accordingly, only packages applicable to the models AAA and BBB are extracted from the package list.

At Step S111, the Web application 12 generates a package list page that shows the packages in the extracted package list, and outputs the package list page to the httpd 11 at Step 112. Then, at Step S113, the httpd 11 transmits the package list page to the terminal 40 such that the package list page is displayed by the Web browser of the terminal 40.

Figure 13:
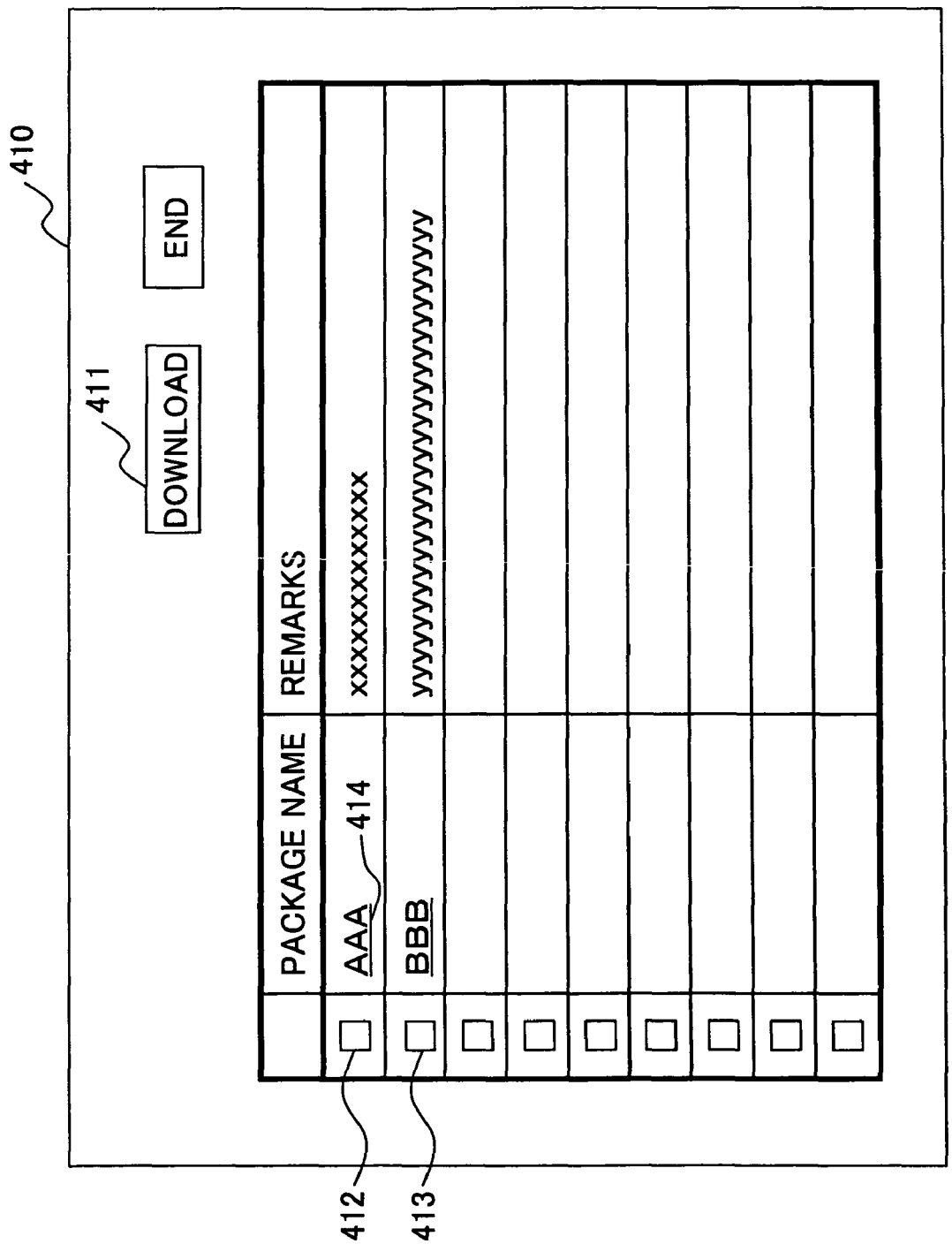
FIG. 13 shows a display example of the package list.

FIG. 13 shows an example of the display of a package list page 410, which contains the package information only for the models "AAA", and "BBB" that are managed by the apparatus management server 10, and are managed by the file server 20.

Figure 14:
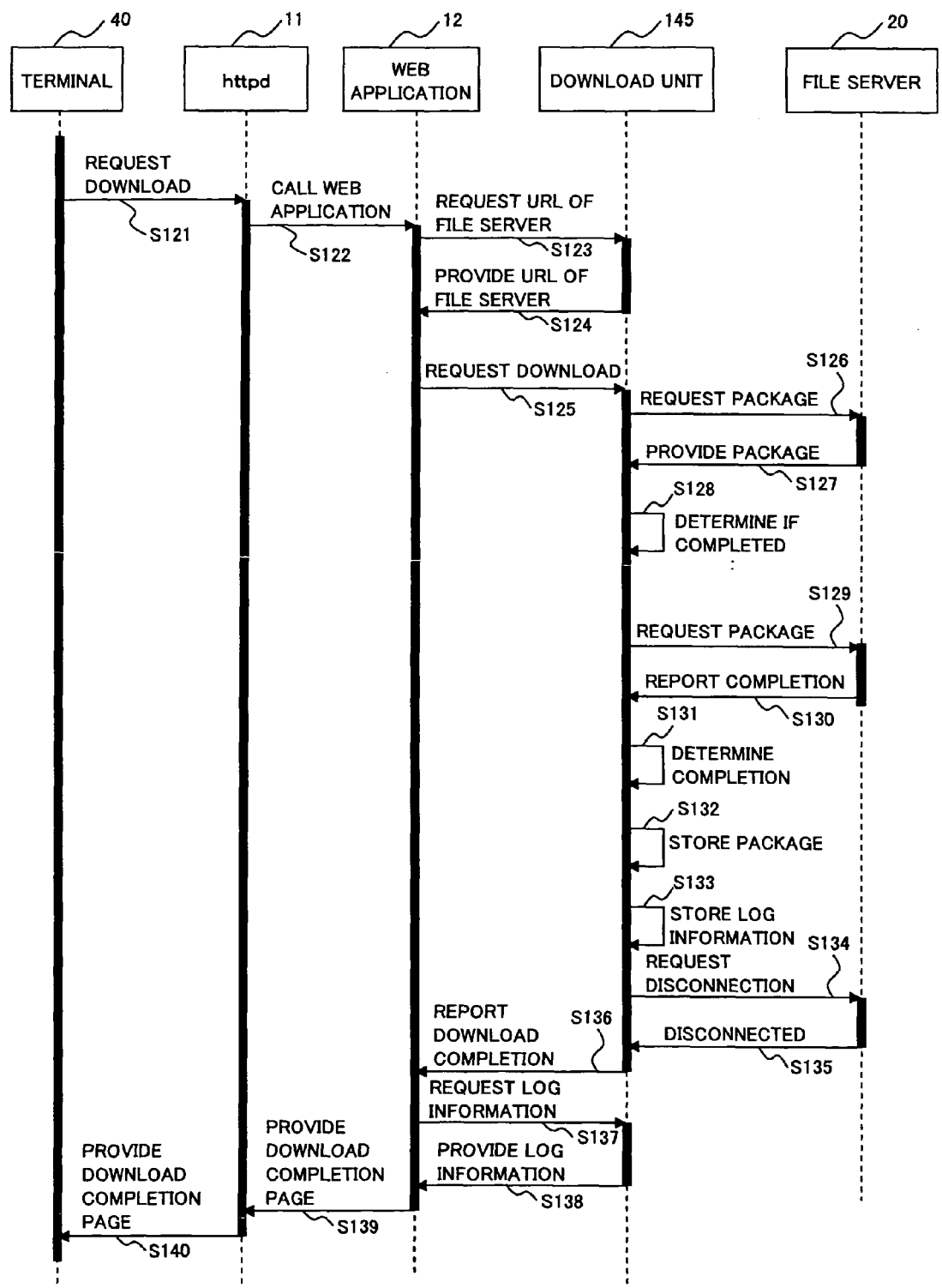
FIG. 14 is a sequence diagram of a package downloading process.

Next, a package downloading process based on the package list page 410 is explained. FIG. 14 is a sequence diagram of the package downloading process.

At Step 121, the user checks a check button such as a check button 412 and check button 413 (FIG. 13) associated to the packages in the package list page 410 for selecting downloading targets, and clicks a download button 411 such that the terminal 40 sends a command to download the selected packages to the apparatus management server 10. A package selected as a candidate for downloading is called a "target package".

At Step S122, the httpd 11 calls the Web application 12. Then, at Steps 123 and S124, the Web application 12 acquires the URL of the file server 20 from the download unit 145. At Step S125, the Web application 12 requests downloading of the target package from the download unit 145. Here, in the downloading command, the Web application 12 provides the download unit 145 with information such as the URL of the file server 20 that is obtained at steps S123 and S124, a URL of the place where the loaded package is to be stored, the package name of the target package, and information as to whether overwriting is allowed when a file having the same package name is already downloaded.

At Step S126, the download unit 145 requests the file server 20 to provide the target package based on the information provided by the Web application 12. Then, at Step S127, the file server 20 acquires the target package from the package storing unit 21, and communicates the target package to the download unit 145. At Step S128, the download unit 145 determines whether download is completed based on a response from the file server 20. Since a package is often divided into two or more pieces in consideration of the communications workload, two or more exchanges are carried out between the download unit 145 and the file server 20. When all the divided pieces are completely transferred, information to that effect is contained in the response of the file server 20.

When Steps S126 through S128 are repeated, and the response from the file server 20 indicates that the transfer is completed at Steps S129 and S130, the download unit 145 determines that the download is completed, and stops sending the request to send the package to the file server 20 at Step 131.

At Step S132, the download unit 145 stores the package downloaded from the file server 20 as a file in the package storing unit 143. At Step S133, the download unit 145 stores log information as to whether the download process is successful as log information. Then at Step 134 and S135, the download unit 145 ends the communications session with the file server 20, and at Step 136, provides the Web application 12 with information indicating that the download is completed.

At Step S137, the Web application 12 requests the download unit 145 to provide the log information in order to determine whether the downloading is successfully completed. At Step S138 the download unit 145 provides the Web application 12 with the log information stored in the download unit 145. In the case that the log information indicates that the download is successful, the Web application 12 provides a Web page that indicates that the download is successful (download success page) to the httpd 11 at Step 139.

At Step 140, the httpd 11 provides the terminal 40 with the download success page, which is displayed by the Web browser of the terminal 40. In this manner, the user can determine that the download is successfully completed.

As described above, the direction to download by the user is performed on the package list page 410 that shows only applicable packages. That is, packages that are unnecessary for the apparatus management server 10, and packages that are not available in the file server 20 are not displayed, dispensing with user judgment, and facilitating the operations.

Figure 15:
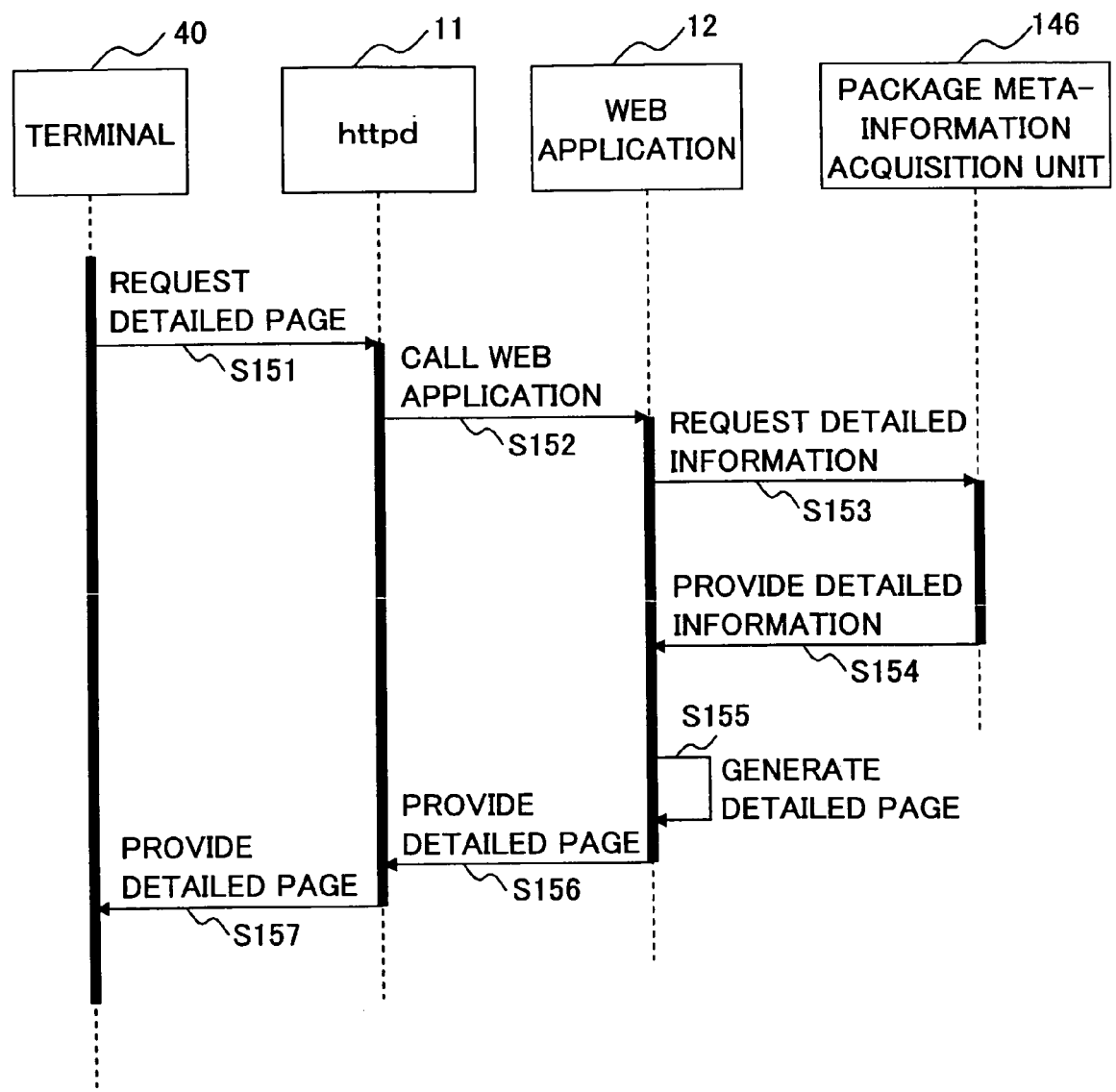
FIG. 15 is a sequence diagram of a detailed package information display process.

Next, a process for presenting detailed information on a package displayed on the package list page 410 is explained with reference to FIG. 15.

If the user clicks a name "AAA" (ref. FIG. 13), for example, detailed information about the package named "AAA" ("package AAA") is requested, the name "AAA" being provided with a hyperlink 414. The terminal 40 sends the request for a Web page displaying the detailed information (detailed page) about the package AAA to the apparatus management server 10 at Step S151.

Then, at Step S152, the httpd 11 calls the Web application 12, and at Step 153, the Web application 12 requests the package meta-information acquisition unit 146 to provide the detailed information of the package AAA. At Step S154, the package meta-information acquisition unit 146 receives the package list, the rru file list, the firmware list, etc., that are communicated from the file server 20, and converted into the data type that can be interpreted by the Web application 12 by Steps S99 through S107 (FIG. 6). The package meta-information acquisition unit 146 edits the package list, the rru file list, the firmware list, etc., into a predetermined form, and provides an edited result to the Web application 12 as the detailed package information.

At Step S155, the Web application 12 generates the detailed page that contains the acquired detailed information, and provides the detailed page to the httpd 11 at Step 156. The detailed page is then provided to the terminal 40 by the httpd 11 at Step 157, and is displayed by the Web browser of the terminal 40.

Figure 16:
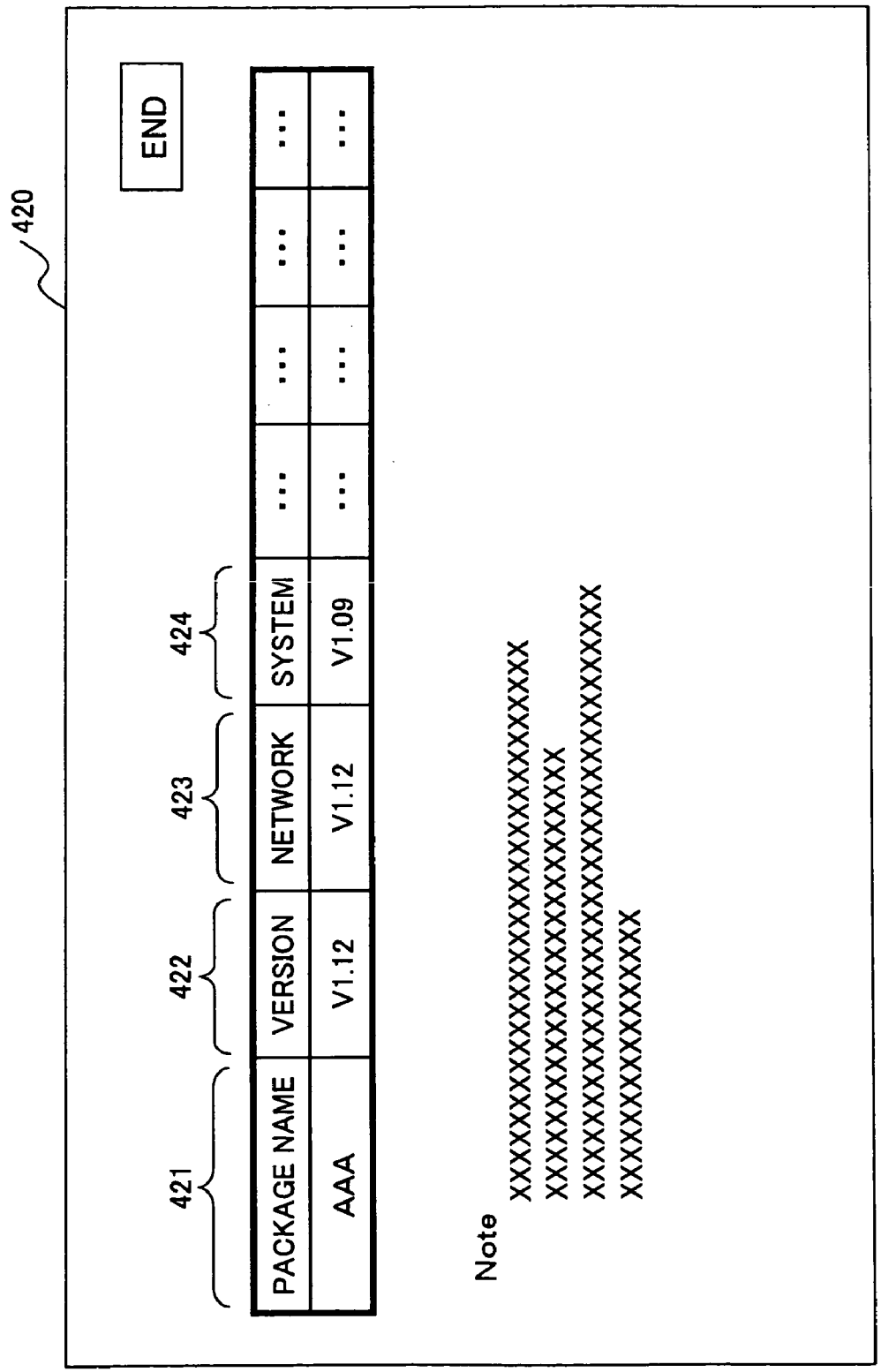
FIG. 16 is a display example of how the detailed package information is displayed.

FIG. 16 shows an example of a display of a detailed page 420. The detailed information of the package AAA is displayed on the detailed page 420. Items 421 and 422 display the package name and the version information of the package AAA extracted from the description 236 and description 234, respectively, of the package list 230 (FIG. 9). The version information on other sets of firmware contained in the package AAA is extracted from the descriptions 253 and 256 of the firmware list 250 (FIG. 11), and displayed at items 423 and 424, respectively. In this manner, the user can obtain the detailed information of the firmware contained in the package by referring to the detailed page 420.

Figure 17:
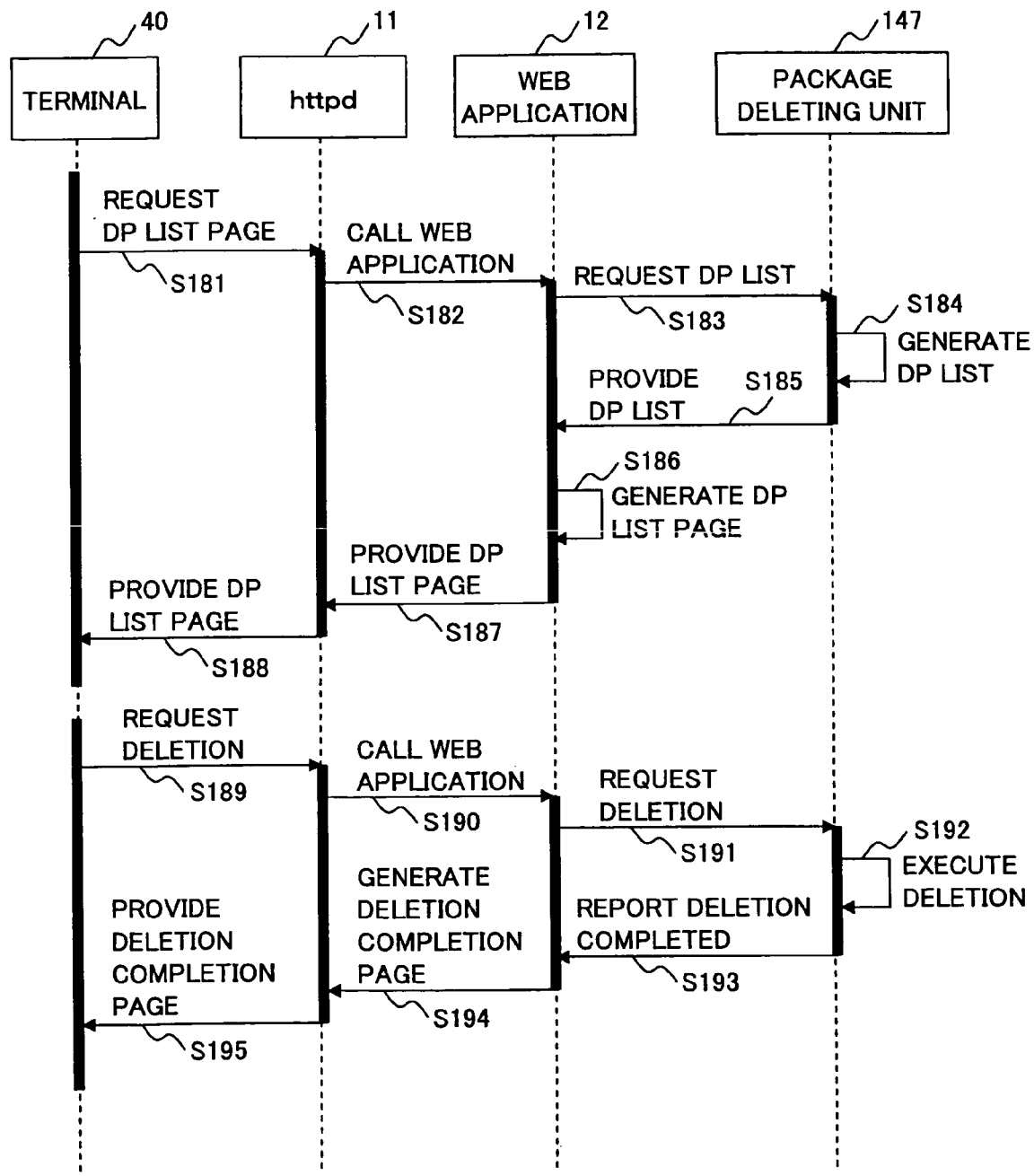
FIG. 17 is a sequence diagram of a deletion process of a package downloaded to the apparatus management server.

Next, a deletion process for deleting a file selected from files downloaded to the apparatus management server 10 is described with reference to FIG. 17, which is a sequence diagram of the deletion process, the deletion being commanded by the user.

At Step S181, based on an input from the user, the terminal 40 requests the apparatus management server 10 to provide a Web page ("DP list page") that displays a package list listing packages that are already downloaded ("downloaded packages") to the apparatus management server 10. As inputs from the user, an input of a URL corresponding to the DP list page to the Web browser, directions of the page change to another Web page, etc., are additionally possible.

At Step S182, the Web application 12 is called by the httpd 11, and at Step 183, the Web application 12 requests the package deleting unit 147 to provide a list of the downloaded packages "DP list". At Step S184, the package deleting unit 147 generates the DP list based on the file names in the folder of the package storing unit 143, and at Step 185, provides the DP list to the Web application 12. That is, since the downloaded packages are stored as files having the package names as the respective file names, the list of the file names serves as the list of the downloaded packages.

At Step S186, the Web application 12 generates the DP list page based on the DP list acquired from the package deleting unit 147, and outputs the DP list page to the httpd 11 (S187). At Step S188, the httpd 11 sends the DP list page to the terminal 40, and the DP list page is displayed by the Web browser of the terminal 40.

Figure 18:
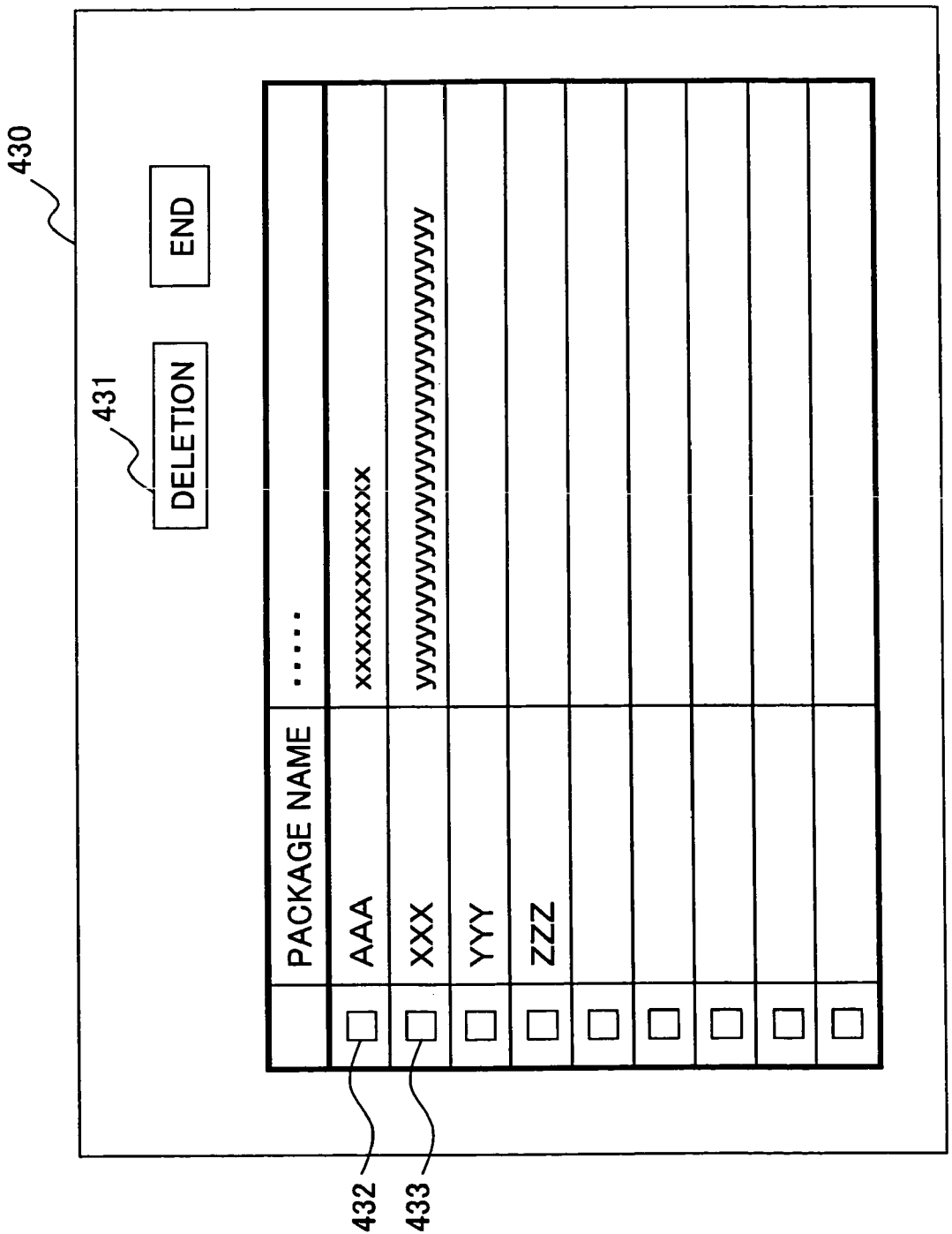
FIG. 18 is a display example how a DP list is displayed.

FIG. 18 is an example of a display of a DP list page 430, which shows the names of the downloaded packages.

At Step S189, the user checks a check button in the DP list page 430 (such as a check button 432 and a check button 433), the check button being associated with a package that is to be deleted, and clicks a deletion button 431. Then, the terminal 40 communicates a command for deleting the selected package to the apparatus management server 10 (S189). Here, the package that is selected for deletion is called a "target package".

At Step S190, the httpd 11 calls the Web application 12. At Step 191, the Web application 12 requests the package deleting unit 147 to delete the target package. At Step S192, the package deleting unit 147 deletes the target package, and at Step 193, provides a report that the requested deletion is completed to the Web application 12.

At Step S194, the Web application 12 generates a Web page ("deletion completion page") indicating that the deletion is successfully completed, and sends the deletion completion page to the httpd 11. At Step 195, the httpd 11 sends the deletion completion page to the terminal 40. The deletion completion page is displayed by the Web browser of the terminal 40, and the user can determine that the requested deletion of the target package is successfully performed.

By deleting a downloaded package in this manner, the storage space occupied by an unnecessary package is made available, and the secondary storage 102 can be efficiently used.

Figure 19:
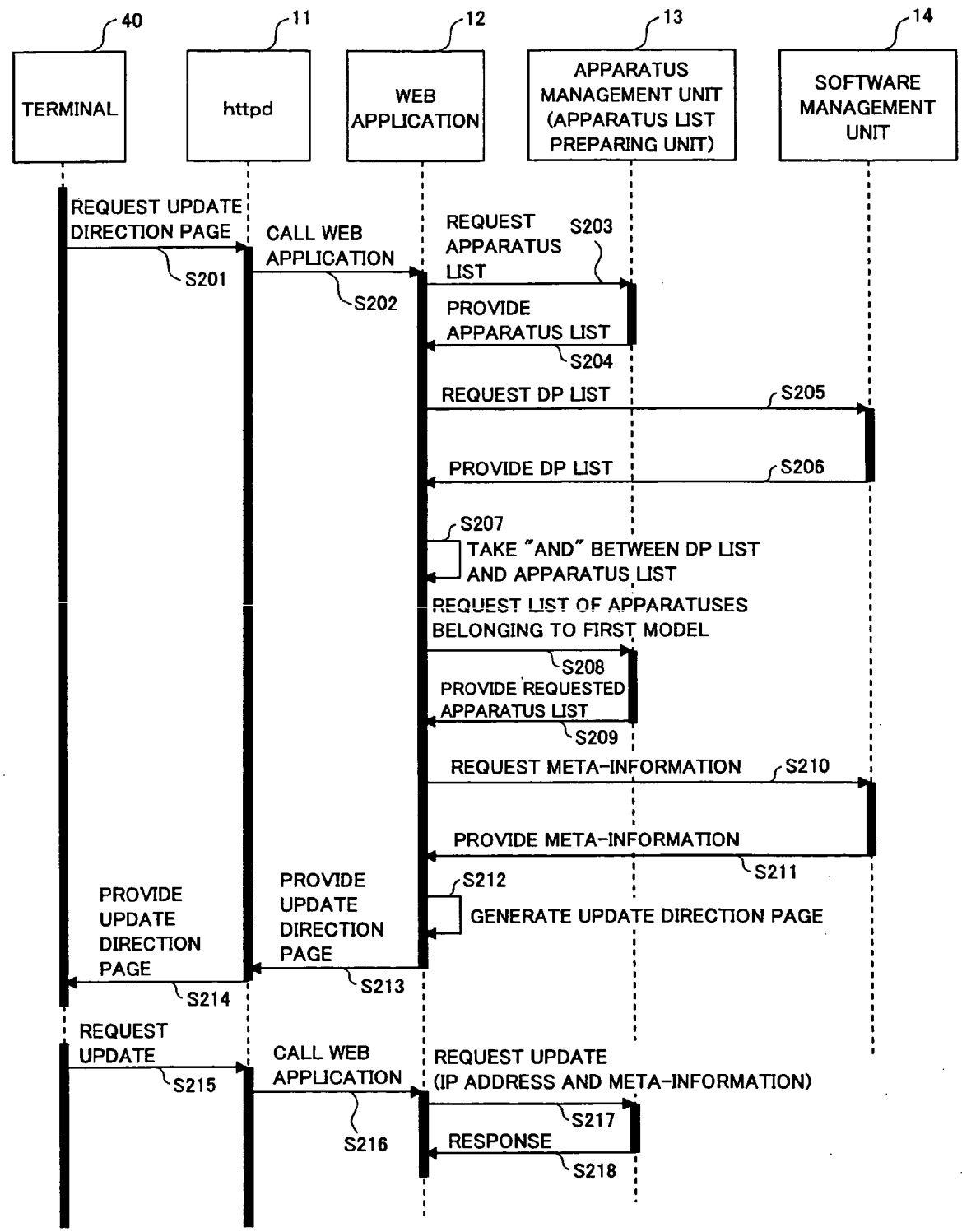
FIG. 19 is a sequence diagram of an update process of firmware of an image formation apparatus.
Figure 20:
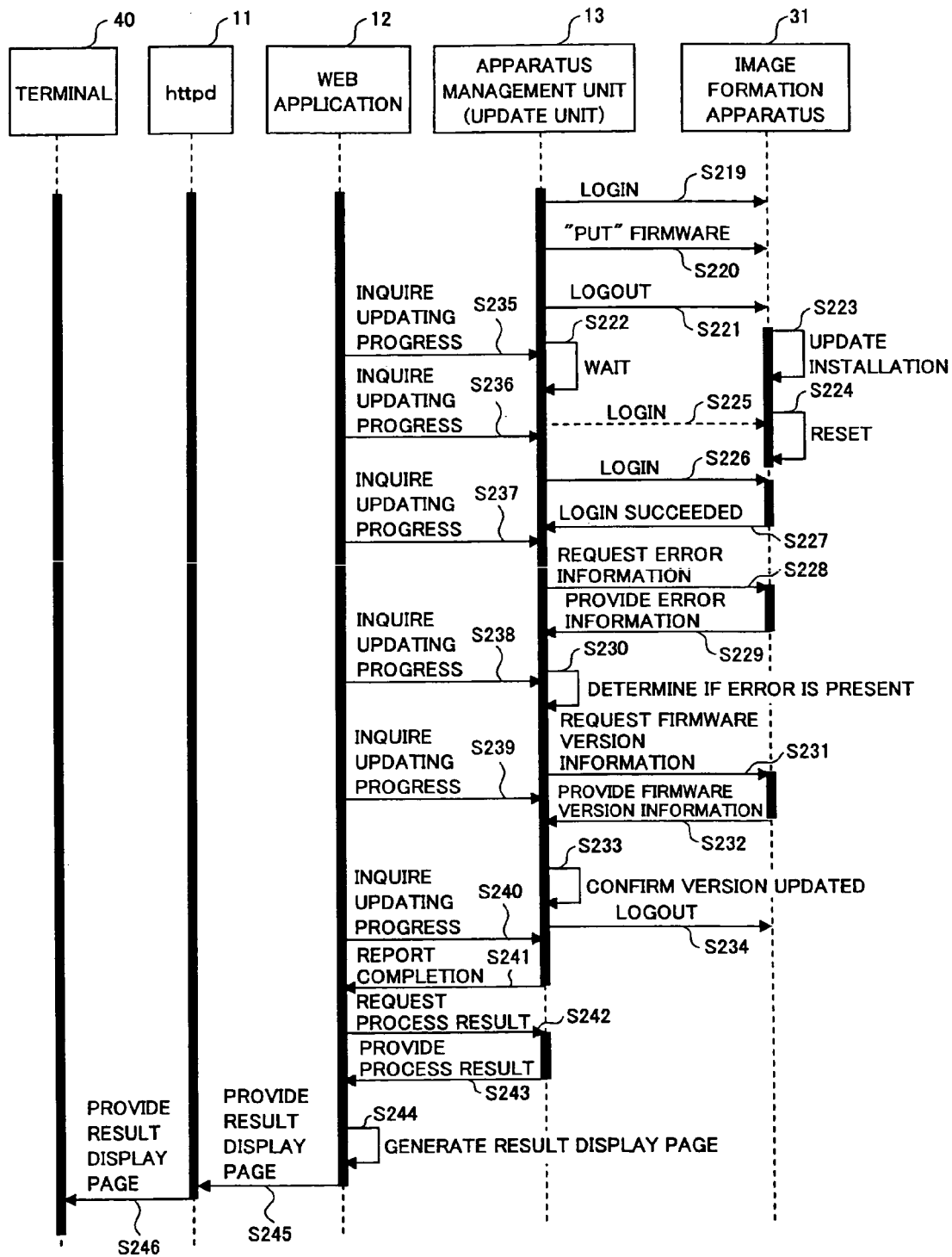
FIG. 20 is a sequence diagram of the update process of the firmware of the image formation apparatus.

Next, a software updating process of the image formation apparatus 31 by the package that is downloaded to the apparatus management server 10 and stored in the package storing unit 143 is explained. FIG. 19 and FIG. 20 are sequence diagrams for explaining the software updating process of the firmware of an apparatus, for example, the image formation apparatus 31.

At step S201, based on the input from the user, the terminal 40 requests (HTTP request) the apparatus management server 10, specifically, the httpd 11 to provide a Web page ("update direction page") for selecting a package and an image formation apparatus that are to be updated. As inputs from the user, an input of a URL to the update direction page to the Web browser, directions of page change to another Web pages, etc., are additionally possible.

At Step S202, the httpd 11 that receives the HTTP request from the terminal 40 calls the Web application 12, and requests the Web application 12 to generate the update direction page. At Step S203, the Web application 12 requests the apparatus list preparing unit 131 of the apparatus management unit 13 to provide information (apparatus list) about the image formation apparatuses managed by the apparatus management server 10.

At Step S204, the apparatus list preparing unit 131 acquires an apparatus list from the apparatus information storing unit 132, and communicates the apparatus list (FIG. 12) to the Web application 12. At Step S205, the Web application 12 requests the package list preparing unit 141 of the software management unit 14 to provide the package list information (DP list) that is already downloaded from the file server 20 to the apparatus management server 10, and stored in the package storing unit 143.

At Step S206, the package list preparing unit 141 generates the DP list based on package file name information stored in the package storing unit 143, and provides the DP list to the Web application 12. Here, since a package name corresponds to a model name of an image formation apparatus, the DP list serves as a list of models.

At Step S207, the Web application 12 extracts packages corresponding to the model of the image formation apparatuses managed by the apparatus management server 10 out of the DP list by taking an AND of the model name of the DP list, and the model name of the apparatus list.

That is, the update direction page has to display a list of packages such that the user can select a package as an updating target. However, not all the packages in the DP list may be for the image formation apparatuses managed by the apparatus management server 10. This is because the image formation apparatuses managed by the apparatus management server 10 may be removed and added, but the changes may not be timely reflected in the arrangement of the packages in the package storing unit 143.

Further, the DP list may not contain all packages for all the models managed by the apparatus management server 10. There are cases where a package is not yet downloaded from the file server 20.

That is, if the DP list based on the package storing unit 143 is displayed as is in the update direction page, package information for a model that is not under the management of the apparatus management server 10 may be included. Further, if the update direction page is generated based on only the apparatus list acquired from the apparatus information storing unit 132, information about a package that is not available from the apparatus management server 10 may be included.

Accordingly, in order to avoid this situation taking place, and to provide the user only with valid package information, the Web application 12 extracts the information corresponding to the image formation apparatus managed by the apparatus management server 10 out of the DP list. In addition, since the apparatus list of FIG. 12 is constituted by the information on the models AAA and BBB, according to the present embodiment, packages for the models AAA and BBB are extracted out of the DP list. The package list information extracted as above is called an "extracted package list".

At Step S208, the Web application 12 requests the apparatus list preparing unit 131 to provide a list of image formation apparatuses that belong to a model specified by the first package ("head package") of the extracted package list. At Step S209, the apparatus list preparing unit 131 searches the apparatus information storing unit 132 for apparatuses belonging to the model specified by the head package. A list of the searched apparatuses is provided to the Web application 12. For example, if the head package specifies the model AAA, an apparatus list constituted by the information about the image formation apparatuses corresponding to the entry of the first line, the third line, and the fourth line of FIG. 12 are generated. Here, the generated apparatus list is used as information for selecting an image formation apparatuses to be updated on the update direction page.

At Step S210, the Web application 12 requests the package meta-information preparing unit 142 of the software management unit 14 to provide package meta-information that is stored in the package meta-information storing unit 144. At Step S211, the package meta-information preparing unit 142 acquires the requested package meta-information from the package meta-information storing unit 144, and communicates it to the Web application 12.

FIG. 21, FIG. 22, and FIG. 23 jointly show an example of package meta-information 145A stored in the package meta-information storing unit 144. According to the present embodiment, the package meta-information 145A is expressed by XML as shown in these figures. In these figures, a description delimited by a pair of a start tag 1451 (in FIG. 21) and an ending tag 1458 (in FIG. 23) represents a definition of the meta-information for a package.

A description 1452 shows the header information of a package, and includes a version number (description 1452*a*), a pathname (description 1452*b*) of the package that is extracted (defrosted), a size (description 1452*c*) of the package, ID (identification information) (description 1452*d*) of the package, a model name (description 1452*e*) to which the package is applicable, and the like.

The example shown by FIGS. 21, 22 and 23 includes five "rru" files as defined by a description 1453 (FIG. 21), descriptions 1454 and 1455 (FIG. 22), and descriptions 1456 and 1457 (FIG. 23), each of which is a structure description delimited by respective pairs of <object> tags, and the type attribute of each of which is "rru". The descriptions show meta-information of the respective rru files (first element information). That is, the package contains five rru files. The meta-information of each rru file consists of header information and meta-information on respective firmware contained in the rru file.

For example, a description 1453-1 of the description 1453 (FIG. 21) is the header information of the rru file concerned, and includes ID description 1453-1a (identification information), a size description 1453-1b, etc., of the rru file. Further, descriptions 1453-2 and 1453-3 that are structures delimited with respective pairs of <object> tags show the meta-information of each firmware contained in the respective rru files (second element information), a value of the type attribute of the descriptions being "module", and serving as child elements of the meta-information of the rru file. That is, the rru file contains two sets of firmware in this example.

The meta-information of each firmware consists of required period for update (for example, a description 1453-2a), an update time-out determining time (1453-2b), a name of the firmware (for example, a description 1453-2d), version information on the firmware (for example, a description 1453-2f), identification information (for example, descriptions 1453-2c, 1453-2d, and 1453-2g) of the firmware, etc. Here, the required period for update is a time taken in order to upload the firmware concerned to an image formation apparatus. The update time-out determining time is described below.

Here, the package meta-information 145A is generated by merging the information included in the package list 230, the rru file list 240, and the firmware list 250 that are acquired from the file server 20 at Steps S99 through S106 (FIG. 6) for each package.

At Step S212, the Web application 12 generates an update direction page based on the extracted package list generated at step S207, and the apparatus list of the model that is specified by the head package acquired at Step S209, and outputs the update direction page to the httpd 11 at Step S213. Then, at Step S214, the httpd 11 communicates the update direction page to the terminal 40, and the update direction page is displayed by the Web browser of the terminal 40.

FIG. 24 shows an example how an update direction page 440 is displayed. As shown in FIG. 24, the update directions page 440 consists of a combobox 441, a table 442, an upload time direction area 443, an update button 444, and so on as required.

The combobox 441 is for selecting a package for updating, selection being performed concerning the extracted package list. Initially, as a default, the package name of the head package is displayed.

The table 442 is an area where a list of the image formation apparatuses belonging to the model specified by the combobox 441 is displayed. That is, when a package different from what is currently shown in the combobox 441 is selected, the fact is provided to the apparatus management server 10, Steps S208 through S214 mentioned above are carried out, and the list of the image formation apparatuses belonging to the model specified by a newly selected package is displayed on the table 442. Further, in the table 442, an image formation apparatus for which the update is to be carried out is selected by checking a check button 445.

The upload time direction area 443 is an area for selecting the timing (time) when the selected firmware should be uploaded by the apparatus management server 10. For example, whether uploading is to be performed immediately, or later can be specified. When the upload is to be performed later, the time to perform uploading can be specified. The update button 444 is a button for sending a direction of update to the apparatus management server 10.

In addition, each IP address of the image formation apparatuses as displayed by the table 442 is hyperlinked to a Web page, "firmware information page", that contains firmware information such as version information on the present firmware installed in the image formation apparatus. Accordingly, when the user clicks an IP address of the image formation apparatus, the firmware information page of the selected image formation apparatus is displayed.

Figure 25:
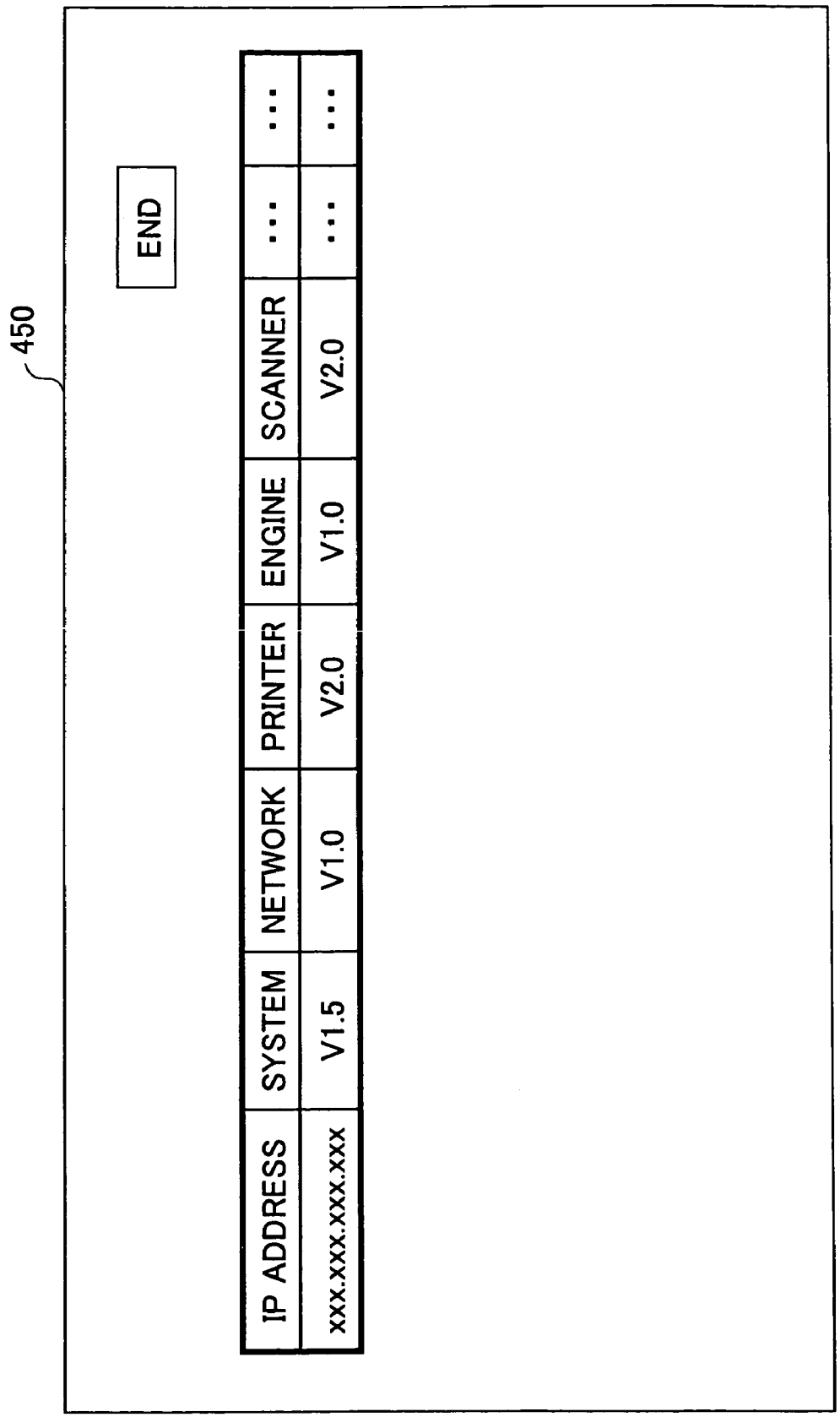
FIG. 25 shows a display example of firmware information.

FIG. 25 shows an example of a display of a firmware information page 450. As shown in FIG. 25, version information on each set of firmware (such as for a system, a network, a printer, an engine, a scanner, etc.) installed in the image formation apparatus is displayed on the firmware information page 450. The user can determine whether updating is necessary as for the firmware of the image formation apparatus concerned by referring to the firmware information page 450.

At Step S215, the update button 444 is clicked on the update directions page 440 where a target package and a target image formation apparatus to be updated are selected. Then, the terminal 40 communicates a command to update firmware to the httpd 11 of the apparatus management server 10. Here, according to the example, the package AAA is selected as the target package, and the image formation apparatus 31 is selected as the target apparatus.

At Step S216, the httpd 11 calls the Web application 12. At Step S217, the Web application 12 requests the updating unit 133 of the apparatus management unit 13 to upload the target package to the image formation apparatus 31. Here, when the Web application 12 requests the upload, the IP address of the target image formation apparatus 31 and the package meta-information that is obtained at Step S211 are provided to the updating unit 133 as information for identifying the target image formation apparatus.

At Step S218, the updating unit 133 responds to the upload command of the Web application 12, and an uploading process starts such that the package is uploaded to the image formation apparatus 31. Then, at Step S219 (FIG. 20), the updating unit 133 of the apparatus management unit 13 performs login to the communication control unit 311 of the image formation apparatus 31. Here, according to the present embodiment, communications between the updating unit 133 and the image formation apparatus 31 are carried out by FTP; however, other protocols may be used.

At Step S220, the updating unit 133 acquires the requested target package from the package storing unit 143, and uploads the target package to the package temporary storing unit 313 of the image formation apparatus 31 with a put command. At Step S222, the updating unit 133 logs out from the image formation apparatus 31, and waits for a period that is equal to a sum of the required periods for updating defined for each set of firmware by the package meta-information 145A (FIG. 21, etc.) for the target firmware.

At Step S223, the update control unit 312 of the image formation apparatus 31 controls the software updating process carried out by the updating unit 133 of the target package that is uploaded. Specifically, the image formation apparatus 31 arranges the firmware contained in the target package that is uploaded in the package temporary storing unit 313 to a place (i.e., the firmware storing unit 314) where the firmware should be arranged at the time of execution, and the value of the version information of the firmware managed by the version information storing unit 316 is updated to the version of the newly applied firmware.

FIG. 26 shows an example of the version information of the firmware managed by the version information storing unit 316. As shown in FIG. 26, the version information of the firmware includes a firmware name, a firmware ID, and a version description for every set of the firmware.

At Step S224, the update control unit 312 resets (reboots) the image formation apparatus 31 such that the new firmware is reflected upon the operations of the image formation apparatus 31. Further, if an error occurs in the software updating process, the update control unit 312 stores information about the error in the error information storing unit 315.

FIG. 27 shows an example how the error information is configured in the error information storing unit 315. The error information includes an error code and the ID of the firmware that generated the error for every error as shown in FIG. 27. The error code is for indicating what error is generated. The ID of the firmware that generated the error is the firmware ID of the firmware that failed in updating.

At Step S225, the updating unit 133 of the apparatus management server 10 attempts to login again to the image formation apparatus 31 after waiting the period required for update (ref. S222). Here, when the login to the image formation apparatus 31 is performed like Step S225, that is, while the image formation apparatus 31 is resetting, there is no response to the login command. Therefore, the updating unit 133 determines that the software updating process is not completed by the image formation apparatus 31. Another attempt to login is carried out like at Step S226. By repeating login attempts, the updating unit 133 eventually determines a result of the software updating process performed by the image formation apparatus 31.

As described above, since there is a waiting period provided at Step S222 (the period required for update), the number of attempts to login is reduced, and consequently the network communications workload is reduced as compared with the case where login attempts start and are repeated without a waiting period. According to the present embodiment, it is possible that the first login by the updating unit 133 after the waiting period will be successful. Even if the first attempt is not successful, and attempts are to be repeated, the number of the login attempts is reduced according to the present embodiment. Here, the required period duration for update is set up appropriately, e.g., based on experience. Since the required period for update is managed by the package meta-information storing unit 144 independently of the program logic of the updating unit 133, the required period for update can be easily adjusted when required.

When the login is successful like at Step S227, the updating unit 133 determines that software updating process is completed by the image formation apparatus 31, and requests the image formation apparatus 31 to provide the error information at Step S228. Then, at Step S229, the image formation apparatus 31 provides the error information to the updating unit 133, if the error information is stored in the error information storing unit 315. If there is no error information stored, information to that effect is provided.

Here, the process of Step S225 through Step S229 is explained in detail with reference to FIG. 28, which is a flowchart for explaining a determining process for the updating unit 133 determining the completion of the software updating process by the image formation apparatus 31.

At S301 (equivalent to Steps S225 and S226 of FIG. 20), login is requested. Whether the login is successful is determined at S302. If the login is determined to be successful, the error information is acquired from the image formation apparatus 31 at S303 (equivalent to Steps S228 and S229 of FIG. 20). Then, at S304, whether an error has occurred in the software updating process is determined based on the information acquired from the image formation apparatus 31. If it is determined that an error has occurred, at S305, the process waits for a predetermined period of time. Then at S306, the upload process is repeated starting from Step S220. When no errors have occurred, a normal finish is set up as a process result at S307.

In the case that login goes wrong (No at S302), the process proceeds to S308 where whether a predetermined term equal to a sum of update time-out determining times defined for every firmware set has elapsed after performing the first login command at Step S301. If it is determined that the predetermined term has elapsed, a time-out error is set up as the process result at S309. If, otherwise, the update time-out determining time has not passed yet, the process returns to the login step S301. In this manner, when login goes wrong, the login process being infinitely attempted by the updating unit 133 is prevented from occurring by determining the elapse of the update time-out determining time.

Figure 28:
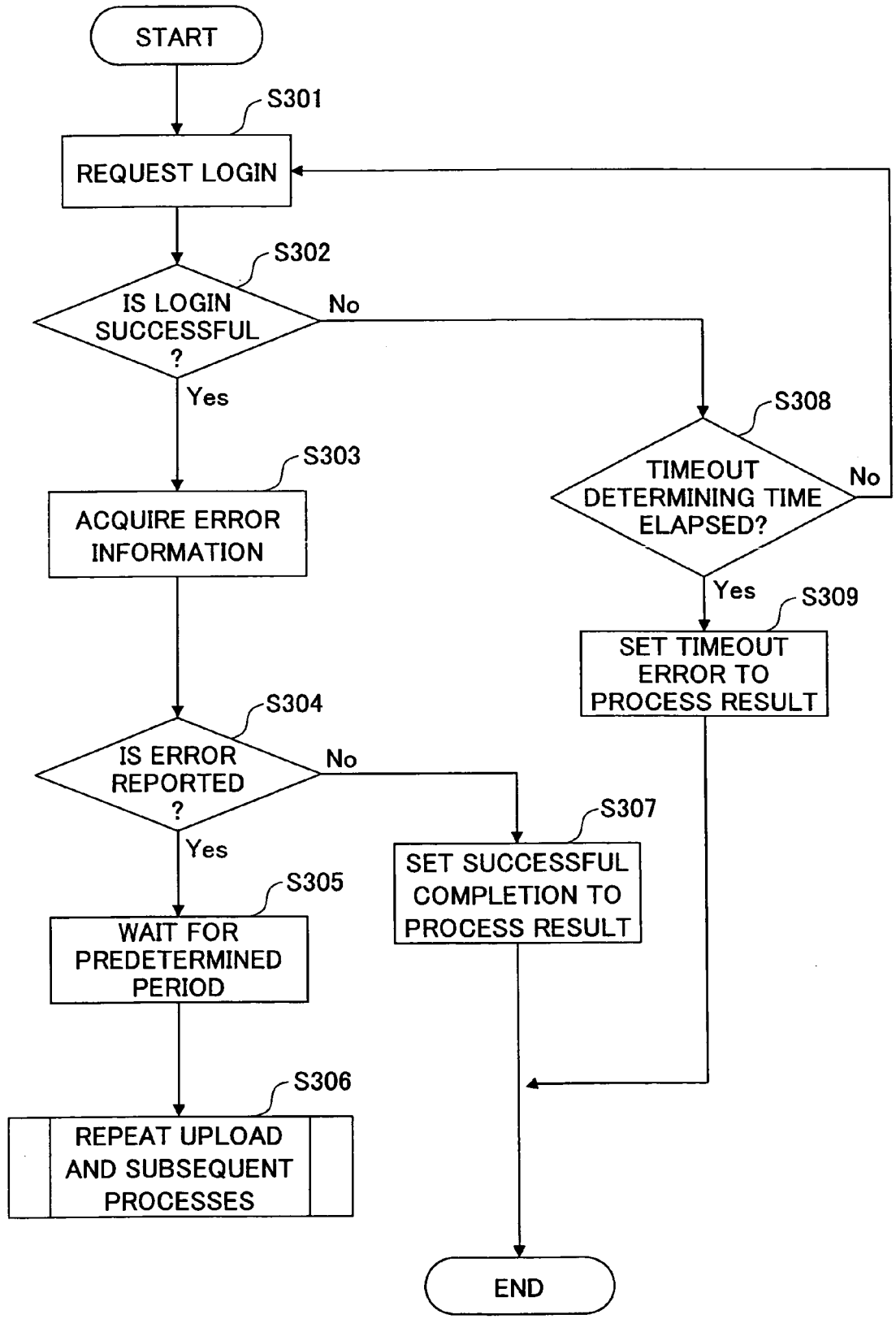
FIG. 28 is a flowchart of a determining process for determining whether an update process of the image formation apparatus performed by the updating unit is successful.

Referring to FIG. 20, at Step S230, the updating unit 133 determines whether an error is generated based on the process result set up by Steps S307 and S309 (FIG. 28). At Step S231, the updating unit 133 requests the image formation apparatus 31 to provide present firmware version. At Step S232, the image formation apparatus 31 acquires the version information of the firmware from the version information storing unit 316, and provides the version information to the updating unit 133.

At Step S233, the updating unit 133 determines whether the firmware contained in the target package is duly updated by the image formation apparatus 31 by determining whether the version information of the firmware contained in the target package indicated by the package meta-information 145A (FIG. 21, etc.) and the version information acquired from the image formation apparatus 31 agree. In this manner, even when the software updating process fails without an error being detected, the updating unit 133 can detect that the software updating process has gone wrong.

At Step S234, the updating unit 133 logs out from the image process system 31.

On the other hand, the Web application 12, after requesting the updating unit 133 to update the package at S217, periodically communicates an inquiry to the updating unit 133 at Steps S235 through S240 such that it can determine whether the software updating process is completed. At S241, when the logout process of Step S234 is completed, the updating unit 133 communicates information indicating that the software updating process is completed to the Web application 12.

When the information indicating that the software updating process is completed is provided by the updating unit 133, the Web application 12 requests the updating unit 133 to provide information as to whether the software updating process is normally completed, i.e., the process result, at Step S242. Then, at Step S243, the process result is received. Then, at Step S244, the Web application 12 generates a Web page ("result display page") for displaying the process result that is acquired at step S243. At Step S245, the result display page is provided to the httpd 11. At Step S246, the httpd 11 provides the result display page to the terminal 40, and the result display page is displayed by the Web browser of the terminal 40.

FIG. 29 shows an example of a result display page 460. As shown in FIG. 29, the process result is displayed on the result display page 460 as the list of the image formation apparatus that completes the software updating process.

As described above, the apparatus management server 10 provides the terminal 40 with the display page 460 indicating that the software updating process of the image formation apparatus 31 is completed, having determined that the software updating process is completed. Accordingly, the user of the terminal 40 can determine that the software updating process of the image formation apparatus 31 is completed in a timely manner.

In addition, in recent years and continuing, specialized products that have information processing capability equal to a computer serving as a Web server, and the like, are being aimed at providing one or more specific functions. For example, the present invention is applicable to an image formation apparatus that is capable of offering two or more applications including printing, copying and facsimile services, called a fusion machine or a compound machine. Further, the present invention also applies to an image formation apparatus having a Web server function, and being capable of mounting applications.

The apparatus management system 1 according to the present embodiment is applicable to the image formation apparatus as described immediately above, an example of which is shown by FIG. 30. FIG. 30 shows an example of an apparatus management system 500 wherein an image formation apparatus serves as the apparatus management server. In FIG. 30, the same reference marks are given to the same components as FIG. 2, and explanations thereof are not repeated.

When the structure of FIG. 30 is compared with FIG. 2, there is no apparatus management server 10 in FIG. 30, but the facilities of the apparatus management server 10 are provided to the image formation apparatus 31 instead, the facilities including an httpd 301, a Web application 302, an apparatus management unit 303, a software management unit 304, and the like.

As described above, the same effect of the present invention can be acquired by providing the image formation apparatus 31 with the facilities of the apparatus management server 10.

In addition, according to the present embodiment, although explanations above refer to the example (FIG. 5) wherein the apparatus management server 10 includes the apparatus management unit 13 and the software management unit 14, these units may be provided by other computers. For example, the apparatus management system 1 may include a computer that is equipped with the apparatus management unit 13, and a computer that is equipped with the software management unit 14. When using the functions of the apparatus management unit 13 and the software management unit 14, the Web application 12 of the apparatus management server 10 is arranged to communicate with these units. In this case, the apparatus management unit 13 and the software management unit 14 are mounted as Web services of the respective computers, and communications with the Web application 12 are carried out by SOAP. In this manner, the Web application 12 can use the functions of the apparatus management unit 13 and the software management unit 14 by RPC of SOAP, which essentially provides the same operations as the case where the apparatus management server 10 includes the apparatus management unit 13 and the software management unit 14.

Further, the present invention is not limited to these embodiments, but various variations and modifications may be made without departing from the scope of the present invention.

The present application is based on Japanese Priority Applications No. 2003-323536 filed on Sep. 16, 2003, No. 2003-323537 filed on Sep. 16, 2003, and No. 2004-238586 filed on Aug. 18, 2004, with the Japanese Patent Office, the entire contents of which are hereby incorporated by reference.

What is claimed is:

1. An electronic apparatus that causes a network apparatus to perform a software updating process by providing software to the network apparatus, comprising:
   a software management unit that manages the software and software information for performing the software updating process, the software information including a predetermined required period for performing the software updating process and the software information being used for determining timing for requesting the network apparatus to provide a result of the software updating process; and
   an apparatus management unit that requests the network apparatus to provide the result of the software updating process for the software by attempting to log in to the network apparatus after the elapse of the predetermined required period by referring to the software information.

2. The electronic apparatus as claimed in claim 1, wherein the software management unit and the apparatus management unit communicate such that the software information managed by the software management unit is provided to the apparatus management unit, and the apparatus management unit requests the network apparatus to provide the result of the software updating process after the elapse of the predetermined required period based on the software information.

3. The electronic apparatus as claimed in claim 1, wherein the software information is a structure that describes first element information specifying a unit of a program for performing the software updating process.

4. The electronic apparatus as claimed in claim 1, wherein the software information is a structure that describes identification information for identifying a program with which the network apparatus is to perform the software updating process, and first time information specifying the predetermined required period for the software updating process.

5. The electronic apparatus as claimed in claim 4, wherein both the identification information and the first time information are described as values in second element information that correspond to a unit of the program for performing the software updating process.

6. The electronic apparatus as claimed in claim 5, wherein the second element information is described as a child element of the first time information.

7. The electronic apparatus as claimed in claim 4, wherein the predetermined required period is described in the software information as the first time information that specifies the period required for the software updating process.

8. The electronic apparatus as claimed in claim 1, wherein the apparatus management unit requests the network apparatus to provide a result of the software updating process, and determines that the software updating process is not completed if no response is received from the network apparatus.

9. The electronic apparatus as claimed in claim 1, wherein the apparatus management unit repeats requesting the result of the software updating process while no response is received from the network apparatus.

10. The electronic apparatus as claimed in claim 1, wherein the apparatus management unit stops requesting the result of the software updating process from the network apparatus after the elapse of a predetermined term, even if no response is received from the network apparatus.

11. The electronic apparatus as claimed in claim 10, wherein the software information is a structure that describes second time information that specifies the predetermined term.

12. The electronic apparatus as claimed in claim 11, wherein second element information corresponding to a unit of a program for performing the software updating process includes the second time information, first time information specifying the predetermined required period for the software updating process, and the identification information identifying the program for the network apparatus to perform the software updating process.

13. The network apparatus connected to the electronic apparatus, as claimed in claim 1, via a network, comprising:
    a software update control unit that controls the software updating process of the software provided by the electronic apparatus; and
    an error information storing unit that stores a result of the software updating process performed by the software update control unit, wherein
    the result of the update process stored by the error information storing unit is provided to the electronic apparatus according to a request from the electronic apparatus.

14. A management method for an electronic apparatus to cause a network apparatus to perform a software updating process of software used by the network apparatus, including:
    a software providing step of providing the software to the network apparatus, and
    an updating result inquiry step of requesting the network apparatus to provide a result of the software updating process by attempting to log in to the network apparatus after the elapse of a predetermined required period after providing the software by the software providing step, the predetermined required period being specified in software information for performing the software updating process, the predetermined required period in the software information being referred to when determining when to request the network apparatus to provide the result of the software updating process and the software information being used for determining timing for requesting the network apparatus to provide a result of the software updating process.

15. The management method as claimed in claim 14, wherein the software information is a structure that describes first element information specifying a unit of a program for performing the software updating process.

16. The management method as claimed in claim 14, wherein the software information is a structure that describes identification information that determines a program for the network apparatus to perform the software updating process, and first time information specifying the predetermined required period required by the software updating process.

17. The management method as claimed in claim 16, wherein both the identification information and the first time information are described as values in second element information corresponding to the unit of the program for performing the software updating process.

18. The management method as claimed in claim 17, wherein the second element information is described as a child element of the first time information.

19. The management method as claimed in claim 16, wherein the predetermined required period is described in the software information as the first time information, specifying a period required by the software updating process.

20. The management method as claimed in claim 16, wherein the software updating process is determined as not being completed when there is no response from the network apparatus to the inquiry issued by the updating result inquiry step.

21. The management method as claimed in claim 14, wherein the updating result inquiry step is repeated when there is no response from the network apparatus to the inquiry.

22. The management method as claimed in claim 14, wherein the network apparatus is not queried about the result of the software updating process after the elapse of a predetermined term, even if there is no response from the network apparatus to the inquiry issued by the updating result inquiry step.

23. The management method as claimed in claim 22, wherein the software information is a structure that describes second time information specifying the predetermined term, until which the result of the software updating process is requested from the network apparatus.

24. The management method as claimed in claim 23, wherein the second time information corresponding to the unit of the program for performing the software updating process describes as values the second time information, the first time information specifying the period required by the software updating process, and the identification information for identifying the program for performing the software updating process for the network apparatus.

25. A software updating method for the network apparatus that is connected to the electronic apparatus, as claimed in claim 1, via a network, comprising:
    a software updating step performing the software updating process with the software provided by the electronic apparatus,
    an updating result storing step storing a result of the software updating step, and
    an updating result providing step providing the electronic apparatus with the result of the update process stored by the updating result storing step according to a request from the electronic apparatus.

26. A computer-readable recording medium that stores a management program, the management program comprising:
    a software providing step providing software and software information to a network apparatus, and
    an updating result inquiry step requesting the network apparatus to provide a result of a software updating process by attempting to log in to the network apparatus after the elapse of a predetermined required period after providing the software by the software providing step, the electronic apparatus causing the network apparatus to perform the software updating process, and the software being used by the network apparatus, the predetermined required period being specified in software information for performing the software updating process, the predetermined required period in the software information being referred to when determining when to request the network apparatus to provide the result of the software updating process and the software information being used for determining timing for requesting the network apparatus to provide a result of the software updating process.

27. A computer-readable recording medium that stores the software updating program for the electronic apparatus, as claimed in claim 3, to cause the network apparatus to execute the software updating program via a network, the software updating program including:

a software updating step performing the software updating process with the software provided by the electronic apparatus, an updating result storing step storing a result of the software updating process performed by the software updating step, and an updating result providing step providing the electronic apparatus with the result of the software updating process according to a request from the electronic apparatus, the result being stored by the updating result storing step.

28. The electronic apparatus as claimed in claim 1, wherein the apparatus management unit repeats log in attempts until the result of the software updating process is determined.

* * * * *